(12) United States Patent
Lv et al.

(10) Patent No.: US 11,633,943 B2
(45) Date of Patent: Apr. 25, 2023

(54) PROTECTION FILM AND MANUFACTURING METHOD THEREOF, DISPLAY PANEL AND DISPLAY DEVICE

(71) Applicant: Shanghai Tianma Micro-Electronics Co., Ltd., Shanghai (CN)

(72) Inventors: Mingzhe Lv, Shanghai (CN); Jian Jin, Shanghai (CN); Yong Liu, Shanghai (CN)

(73) Assignee: Shanghai Tianma Micro-Electronics Co., Ltd., Shanghai (CN)

( * ) Notice: Subject to any disclaimer, the term of this patent is extended or adjusted under 35 U.S.C. 154(b) by 203 days.

(21) Appl. No.: 17/339,192

(22) Filed: Jun. 4, 2021

(65) Prior Publication Data
US 2021/0291500 A1   Sep. 23, 2021

(30) Foreign Application Priority Data

Mar. 31, 2021   (CN) .......................... 202110351595.5

(51) Int. Cl.
| | |
|---|---|
| *B32B 3/10* | (2006.01) |
| *B32B 27/08* | (2006.01) |
| *B32B 9/04* | (2006.01) |
| *B32B 37/12* | (2006.01) |
| *G02F 1/1333* | (2006.01) |

(52) U.S. Cl.
CPC ................ *B32B 27/08* (2013.01); *B32B 9/04* (2013.01); *B32B 37/12* (2013.01); *G02F 1/133305* (2013.01); *B32B 2457/20* (2013.01)

(58) Field of Classification Search
CPC .. B32B 3/26; B32B 2457/20; G02F 1/133305
See application file for complete search history.

(56) References Cited

FOREIGN PATENT DOCUMENTS

CN   112419890 A   2/2021

OTHER PUBLICATIONS

Chinese Office Action dated Dec. 15, 2022, issued in related Chinese Application No. 202110351595.5 filed Mar. 31, 2021, 13 pages.

*Primary Examiner* — Elizabeth E Mulvaney
(74) *Attorney, Agent, or Firm* — Christensen O'Connor Johnson Kindness PLLC

(57) ABSTRACT

A protection film, a method of manufacturing the protection film are provides, a display panel and a display device. The protection film includes a main portion and at least one cover surrounded by the main portion. The cover is at least partially connected to the main portion. At least part of an edge of the cover is a first edge, and the first edge and the main portion are not fixed.

20 Claims, 16 Drawing Sheets

PROTECTION FILM AND MANUFACTURING METHOD THEREOF, DISPLAY PANEL AND DISPLAY DEVICE

CROSS-REFERENCE TO RELATED APPLICATIONS

The present application claims priority to Chinese Patent Application No. 202110351595.5, filed on Mar. 31, 2021, the content of which is incorporated herein by reference in its entirety.

TECHNICAL FIELD

The present application relates to the field of display technology, and particularly, to a protection film, a display panel, a manufacturing method of the protection film, and a display device.

BACKGROUND

The flexible display panel is a shape-changeable and bendable display device, and has the advantages of being portable, bendable and rollable. Therefore, the flexible display panel is a hot spot in the research and development of display technology.

The film material of the flexible display panel in the related art usually needs to be bendable, but as the usage time increases and the times of bending increases, a series of problems caused by the bending occurs to the film or between films, which affects the normal use of the flexible display panel and reduces the service life of the flexible display panel.

SUMMARY

A protection film is provided. The protection film includes a main portion and at least one cover surrounded by the main portion. Each of the at least one cover is at least partially connected to the main portion, at least part of an edge of each of the at least one cover is a first edge, and the first edge and the main portion are not fixed The present disclosure further provides a display panel including the above protection film. The display panel further includes a substrate located on a side of the protection film, and a light emitting functional layer located on a side of the substrate facing away from the protection film.

The present disclosure further provides a manufacturing method of the protection film, and the manufacturing method includes providing a base material layer; and laser engraving the base material layer to form the first edge.

The present disclosure further provides a display device including the above display panel.

DESCRIPTION OF EMBODIMENTS

Figure 1:
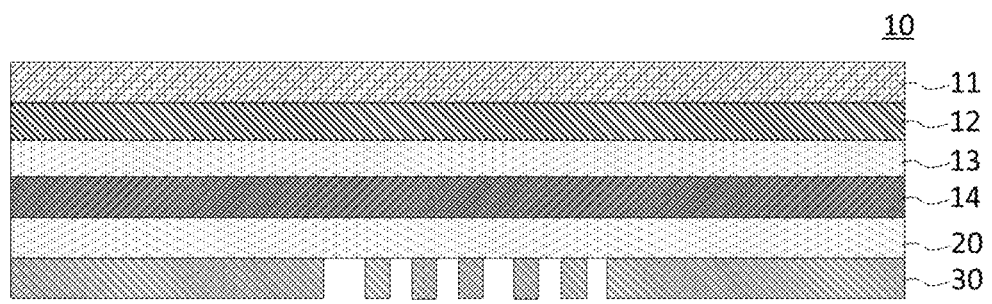
FIG. 1 is a schematic diagram of a display panel.

In order to make the above objectives, features and advantages of the present disclosure clearer and easier to understand, the present disclosure will be further described below in conjunction with the accompanying drawings and embodiments.

It should be noted that details are described as follows so as to illustrate the present disclosure. However, the present disclosure can be implemented in various other ways than those described herein, and those skilled in the art can make additional embodiments without departing from the scope of the present disclosure. The present disclosure is therefore not limited by the embodiments disclosed herein.

The terms used in the embodiments of the present disclosure are merely for the purpose of describing specific embodiments, but not intended to limit the present disclosure. The singular forms of "a", "an" and "the" used in the embodiments of the present disclosure and the appended claims are also intended to indicate plural forms, unless clearly indicating others.

It should be noted that, the terms such as "above", "below", "left", "right" are used to describe orientations and locations in a viewing angel shown in the drawings, which shall not be interpreted as limitations of the present disclosure. In addition, in the context, it should be noted that, when an element is formed "above" or "below" another element, the element can be directly formed "above" or "below" the other element, or can be indirectly formed "above" or "below" the other element through an intervening element.

Further, the illustrated embodiments can be implemented in a variety of forms and the present disclosure is not limited to the embodiments set forth herein; rather, these embodiments are provided to more comprehensively and completely convey the concept of the embodiments to those skilled in the art. The identical reference numerals in the drawings denote the same or similar structures, and a repetitive description thereof is omitted. The words indicating positions and orientations in the present disclosure are described in view of the drawings, which can also change when necessary, and the modifications are included in the scope of the present disclosure. The drawings of the present disclosure are only used to illustrate relative positional relationships, layer thicknesses of some portions are drawn in an exaggerated way in order to facilitate understanding, and the layer thicknesses in the drawings do not represent a proportional relationship of actual layer thicknesses. In the case of no conflict, the embodiments of the present disclosure and the features in the embodiments can be combined with each other. The reference signs are consistent in all drawings of the various embodiments of the present disclosure. In addition, the same features of different embodiments are not repeated.

Figure 2:
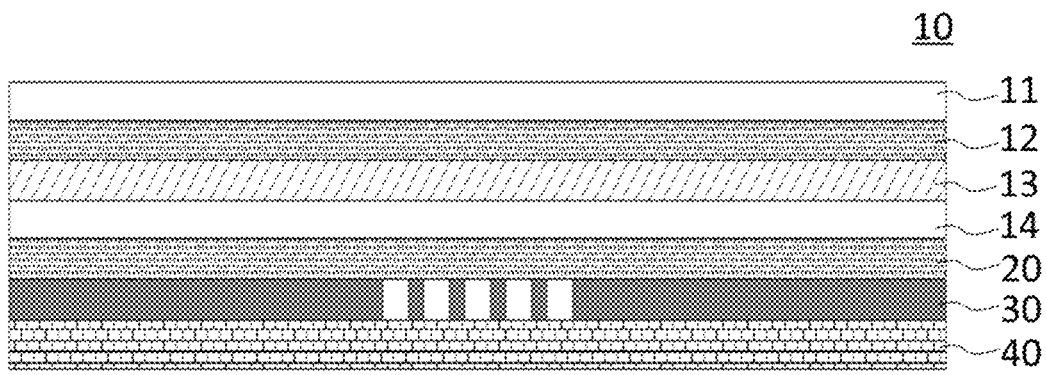
FIG. 2 is a schematic diagram of another display panel.

FIG. 1 is a schematic diagram of a display panel, and FIG. 2 is a schematic diagram of another display panel. It can be understood that FIG. 1 and FIG. 2 are cross-sectional views of the display panel, and the cross-section is perpendicular to the plane of the display panel.

A display panel 10 includes a transparent cover plate 11, an adhesive layer 12, a display layer 13, and a lower support film 14, which are stacked from top to bottom. Further, the display panel 10 also includes a support member 30 provided on a side of the lower support film 14 facing away from the display layer 13, and an optical clear adhesive 20 provided between the lower support film 14 and the support member 30.

In order to improve the bending performance of the display panel, modifications are made to some films of the display panel. Specifically, in order to satisfy the function of the flexible display panel of bending with a small radius, the patterning and hollowing are performed on the bending area of the flexible display panel, and a part of a protection film of the support member is hollowed.

However, since the combination of the support member 30 and the lower support film 14 is achieved by the bonding of the optical clear adhesive 20, the hollow area of the support member 30 is provided, which results in the optical clear adhesive 20 in the bending area overflowing into the hollow area of the support member 30 after the support member 30 and the lower support film 14 are bonded.

As the usage time increases and the times of bending increase, overflowing of the part of the optical clear adhesive 20 into the hollow area of the support member 30 can cause the following adverse effects: (1) shift of the neutral layer of the bending area; (2) slight Moire abnormality in the display image; and (3) adhesion abnormality between the support member located in the hollow area and the display back plate.

In addition, in order to bond the support member 30 and the main body of the display panel in the related art, only the adhesive bonding is the most suitable method (specifically, in FIG. 1 and FIG. 2, an example in which the lower support film 14 is used as a receiving surface of the connection of the support member 30 and the main portion of the display panel, is descripted), and relatively speaking, the optical clear adhesive has the advantages of generally low optical adhesive modulus and good viscous fluidity.

In order to solve the above problem, the solution shown in FIG. 2 is provided. Specifically, a composite layer 40 is provided below the support member 30. However, the problem of the shifting of the neutral layer in the bending area still exists, and the thickness of the entire module and the process steps is increased.

Figure 3:
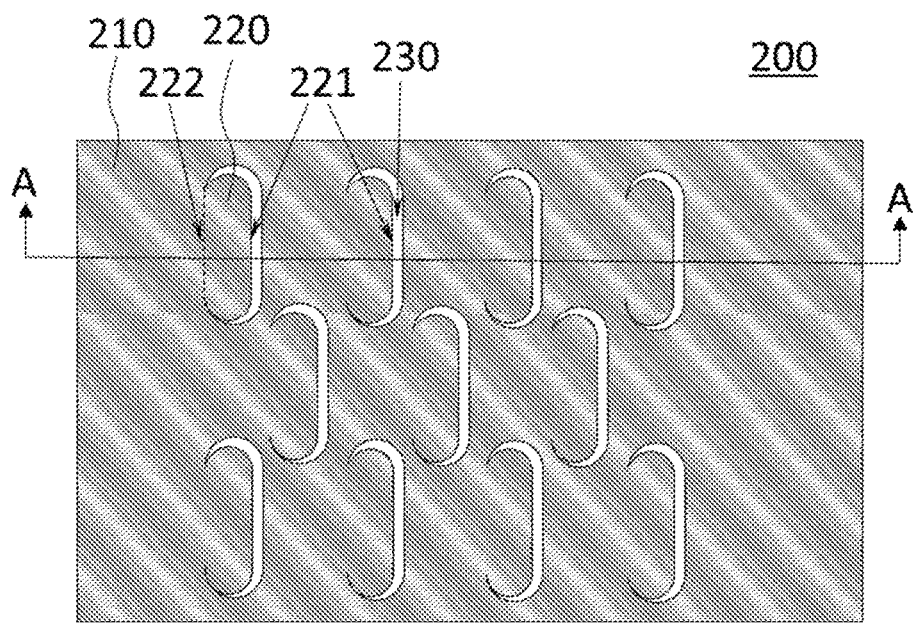
FIG. 3 is a top view of a protection film provided by an embodiment of the present disclosure.
Figure 4:
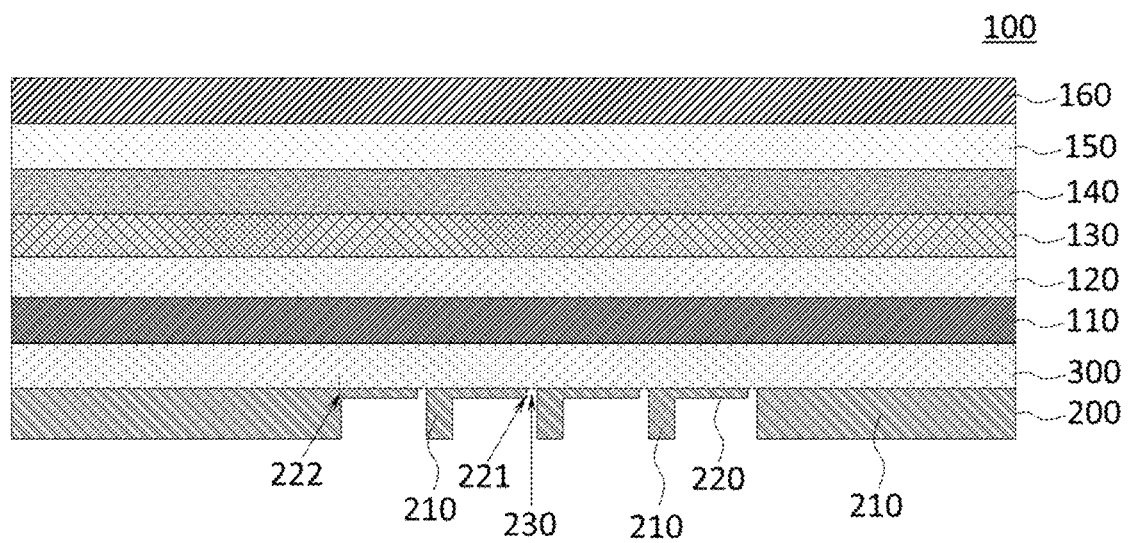
FIG. 4 is a cross-sectional view of a display panel provided by an embodiment of the present disclosure.

In view of the above, as shown in FIG. 3 and FIG. 4, FIG. 3 is a top view of a protection film provided by an embodiment of the present disclosure, and FIG. 4 is a cross-sectional view of a display panel provided by an embodiment of the present disclosure. It should be noted that the protection film shown in FIG. 4 can be understood as the protection film provided by FIG. 3, the cross-sectional in FIG. 4 can be understood as the cross-sectional of the display panel obtained when taking the protection film of FIG. 4 along the section A-A in FIG. 3, and the direction of the section is perpendicular to the display panel.

As shown in FIG. 3, the protection film 200 includes a main portion 210 and at least one cover 220 surrounded by the main portion 210. The cover 220 is at least partially connected to the main portion 210, at least part of an edge of the cover 220 is a first edge 221, and the first edge 221 and the main portion 210 are not fixed.

It should be noted that the division of the protection film 200 (the protection film is divided into the main portion and the cover) is to divide the protection film 200 regarding the protection film as a plane. In other words, the division is performed on the orthographic projection of the protection film on the substrate or the plane of the display panel rather than in the thickness direction.

In an embodiment, the protection film 200 can include a plurality of covers 220, and the plurality of covers 220 can form a plurality of peninsulas distributed in the main portion 210. A part of the cover 220 is connected to the main portion 210, but another part of the cover 220 is not fixed to its adjacent main portion 210. Taking one cover 220 as an example, at the position shown by the dotted line in FIG. 3, the cover 220 at the dotted line and the main portion 210 are connected to each other. The dotted line in FIG. 3 represents the edge of the cover 220 excluding the first edge, and can be understood as the boundary between the cover 220 and the main portion 210. The edge of the cover 220 outside the dotted line is the first edge 221. The first edge 221 and the main portion 210 adjacent to the first edge 221 are not fixed (i.e., not attached) and are disconnected.

It should be noted that "not fixed" does not mean "not in contact", and two parts being "not fixed" means that the two parts are not directly fixedly connected or not formed into one piece. The term "not fixed" herein can also be understood as "not attached." There are embodiments below to describe in detail several cases of "not fixed".

It should be noted that although the first edge 221 is not directly fixed to its adjacent main portion 210, the first edge 221 is indirectly connected to the main portion 210 through the cover 220 and the second edge 222.

In the present embodiment, the cover of the protection film is not fixed to the main portion, which facilitates the bending of the protection film. On the one hand, the first edge can provide a certain bending guiding function, and on the other hand, the disconnection between the first edge and the main portion provides a stress releasing path for the bending of the protection film. In addition, it can provide an effect of bending resistance, and it also can prevent the large opening of the protection film which can cause light transmission, and can prevent external light from affecting the inside of the display panel, especially with some semiconductor devices.

In some embodiments of the present disclosure, the protection film 200 is made of stainless steel (such as SUS steel) or an alloy material.

In an embodiment, the protection film 200 is made of SUS 301 steel.

In an embodiment, the material of the protection film 200 is made of a metal alloy, such as a titanium alloy.

With the material of the protection film in the embodiment, the protection film can support and protect the display panel. In addition, in combination with the material of the protection film of the embodiment, the protection film can function better and achieve the technical effects described in other embodiments of the present disclosure, and is more compatible with the structures in the various embodiments of this disclosure.

In an embodiment, the protection film 200 is an integrally formed structure. That is, the cover 220 and the main portion 210 are formed into one piece, and are formed in the same layer and made of the same material. In this way, the structural stability of the protection film can be improved, and the bending resistance of the protection film can be improved.

In an embodiment, the protection film 200 has a thickness ranging from 100 μm to 200 μm. Because the bending radius of the flexible display panel is usually smaller than 3 mm, such configuration can provide a better support for the protection film, which can not only provide support and prevent over bending, but also prevent the protection film itself from hindering the bending of the display panel. In an embodiment, the thickness of the protective film 200 ranges from 100 μm to 150 μm.

In some embodiments of the present disclosure, the thickness of the cover 220 is smaller than the thickness of the main portion 210. It should be noted that the thickness direction in this embodiment is a direction perpendicular to the plane of the protection film 200, or a direction perpendicular to the plane of the display panel 100.

In an embodiment, the thickness of the cover 220 ranges from 0.02 mm to 0.05 mm, and the thickness of the main portion 210 ranges from 100 μm to 150 μm. This not only meets the size that SUS can be actually sized, reduces the process difficulty, but also ensures that the protection film achieves the above-mentioned technical effects. The thickness design of the embodiment can further enable the cover to have better supporting ability, and avoid wrinkles at the opening of the main portion due to the bending of the support structure. On the other hand, the thickness of the cover is smaller than that of the main portion so as to adjust the bending stress.

In an embodiment, a ratio of the thickness of the cover 220 and the thickness of the main portion 210 ranges from 1/10 to 1/2.

Through the present embodiment, the design of the cover is different from the design of the main portion, so the bending resistance of the protection film can be improved, the bonding ability of the protection film to the film to be adhered thereto can be improved, wrinkles of the panel structure or the film adhered to the protection film can be avoided, and the display Moire of the display panel protected by the protection film can be avoided.

In some embodiments of the present disclosure, a surface of the cover 220 and a surface of the main portion 210 are in the same plane, and together constitute a side surface (hereinafter referred to as a coplanar surface) of the protection film 200. In addition, the coplanar surface is the surface of the protection film facing the basic display panel, that is, the coplanar surface is the side adhered to the basic display panel. Through this embodiment, the protection film can play a good supporting role, wrinkles of the panel structure or the film adhered to the protection film can be avoided, and the display Moire of the display panel protected by the protection film can be avoided.

In an embodiment, the cover includes a top surface and a bottom surface which are opposite to each other and parallel to the plane of the protection film. It should be noted that the terms "top" and "bottom" mentioned here are only used to distinguish the two surfaces and do not limit the high and low positions of the two surfaces. The main portion includes a top surface and a bottom surface which are opposite to each other and parallel to the plane of the protection film. The top surface of the main portion and the top surface of the cover are in the same plane, and together constitute a side surface of the protection film, and the bottom surface of the main portion constitutes another side surface of the protection film. In other words, one side surface of the "cover" is aligned with one side surface of the stainless-steel protection film, while the other side surface of the protection film has a groove or an opening, and an orthographic projection of the groove or the opening on the substrate at least covers or accommodates the cover.

In an embodiment, the end surface of the cover 220 at the first edge 221 is an inclined surface, that is, the end surface is inclined with respect to the direction perpendicular to the plane of the protection film. It should be noted that the end surface mentioned here is the surface connecting the top surface of the cover with the bottom surface of the cover.

In other embodiments of the present disclosure, the thickness of the cover 220 is smaller than or equal to the thickness of the main portion 210, and an elasticity of the cover 220 is greater than an elasticity of the main portion 210. In this way, the cover can provide stress release for bending of the protection film.

With continuous reference to FIG. 3 and FIG. 4, in some embodiments of the present disclosure, a hollow area 230 is provided between the main portion 210 and the first edge 221 of the cover 220 of the protection film 200. In an embodiment, the first edge 221 is not fixed to the main portion 210, and is not in contact with and is disconnected from the adjacent main portion 210.

In an embodiment, the hollow area 230 extends along the first edge 221 of the cover 220 and surrounds the cover 220 in a non-closed manner. In other words, the shape of an orthographic projection of an opening formed by the main portion 210 that accommodates the cover 220, on the plane of the protection film 200 is a similar and enlarged pattern of the shape of an orthographic projection of the cover 220 on the plane of the protection film 200. In addition, a second edge 222 of the cover 220 partially coincides with the edge of the opening of the main portion 210 that accommodates the cover 220. Therefore, the hollow area 230 is formed between the first edge 221 of the cover 220 and the non-coinciding part of the edge of the above-mentioned opening.

Through the present embodiment, with achieving the technical effects of the above embodiments, how to improve the reliability of the protection film is also taken into account. By providing the hollow area, it is avoided that the cover and the main portion are pressed against each other at the first edge when the protection film is bent, which can cause bending difficulty or damage to the protection film. In this embodiment, the cover provides a certain degree of support to avoid wrinkles at the opening of the main portion due to the bending of the supporting structure, so the cover has a certain thickness. On the other hand, the thickness of the cover is smaller than the thickness of the main portion so as to adjust the bending stress. Therefore, the bending will mainly cause the cover to slightly rotate and deform, and the cover will be pressed by the upper OCA adhesive, and the cover will rotate slightly, under the action of two aspects, toward the side facing away from the adhesive layer, that is, toward the opening of the main portion. The cover has a certain thickness, so it will press the adjacent main portion. The hollow area provided in the present embodiment can be regarded as a compensation space that is reserved for avoiding the above problems.

The present disclosure provides a display panel including the above protection film. As shown in FIG. 4, the display panel 100 includes a substrate 110, an array layer 120, a light emitting functional layer 130, and an encapsulation layer 140, which are sequentially arranged. It can be understood that the substrate 110, the array layer 120, the light emitting functional layer 130, and the encapsulation layer 140 together form a basic structure of the display panel. The substrate 110, the array layer 120 and the encapsulation layer 140 enclose the light emitting functional layer 130 in an enclosed space. In the embodiment of the present disclosure, the panel structure including the substrate 110, the array layer 120, the light emitting functional layer 130, and the encapsulation layer 140 is defined as a basic display panel.

In an embodiment, the substrate 110 (i.e., the base substrate) can be flexible, and thus can be stretchable, foldable, bendable or rollable, so that the flexible display panel can also be stretchable, foldable, bendable or rollable. The substrate 110 can be made of any suitable insulating material having flexibility. The substrate 110 is used for blocking oxygen and moisture, preventing moisture or impurities from diffusing through a flexible base, and providing a flat surface on the upper surface of the flexible base. For example, the substrate can be made of a polymer material, such as, polyimide (PI), polycarbonate (PC), polyethersulfone (PES), polyethylene terephthalate (PET), polyethylene naphthalate (PEN), Polyarylate (PAR) or fibreglass reinforced plastics (FRP), and the substrate 110 can be transparent, translucent or opaque. In an embodiment, the display panel can further include a buffer layer (not shown in the drawing) on the substrate 110, and the buffer layer can cover the entire upper surface of the substrate.

In an embodiment, a back plate film (not shown in the drawing) can be provided below the substrate 110 and used for protecting a bottom surface of the basic display panel. In some embodiments, the substrate can include a plurality of sub-layers, and the back plate film can be considered as one of the plurality of sub-layer of the substrate. In an embodiment, the back plate film is an outermost film located on a side of the substrate facing away from the light emitting functional layer of the basic display panel. In this way, the back plate film can become a bearing layer adhered to the protection film in the present disclosure.

In an embodiment, the basic display panel can further include a touch layer (not shown in the drawing) on a side of the encapsulation layer facing away from the substrate, and/or a color filter layer (not shown in the drawing) on the side of the encapsulation layer facing away from the substrate.

In an embodiment, the display panel 100 can also include a transparent cover plate 160, adhered to an upper surface of the basic display panel through an optical clear adhesive 150.

In an embodiment, the display panel 100 further includes a protection film 200 provided on a side of the substrate 110, for example, the protection film is located on a side of the substrate 110 facing away from the basic display panel.

In an embodiment, the protection film 200 and the substrate 110 are bonded by an adhesive layer 300.

In an embodiment, the adhesive layer 300 is an optical clear adhesive, also referred to as OCA. Because the optical clear adhesive generally has a low modulus and good viscous fluidity, the optical clear adhesive and the protection film made of stainless steel can be better matched, and compensate each other's disadvantage.

In an embodiment, the protection film 200 includes a main portion 210 and at least one cover 220 surrounded by the main portion 210. The cover 220 is at least partially connected to the main portion 210. At least part of an edge of the cover 220 is a first edge 221, and the first edge 221 is not fixed to the main portion 210.

In an embodiment, the protection film in the present embodiment can also have the characteristics of the protection film in other embodiments of the present disclosure when not conflicting with other embodiments.

In the display panel provided by the present embodiment, the protection film is adopted to improve bending ability of the display panel and to improve the bending reliability of the display panel. On the one hand, the first edge can provide a certain bending guiding function, and on the other hand, the disconnection between the first edge and the main portion provides a stress releasing path for the bending of the protection film. In addition, the present embodiment can avoid shifting of the neutral layer of the display panel, improve the bonding ability of the protection film to the display panel, and avoid the film separation caused by bending. While ensuring the bending performance, the stability of the neutral surface and stress release, the cover can provide a support function, and thus wrinkles on the display panel are avoided, display moire in the display panel is avoided, and the slight moire abnormal in the display image is avoided. In addition, in addition to an effect of bending resistance, it also can prevent the large opening of the protection film which can cause light transmission, and prevent external light from affecting the inside of the display panel, especially some semiconductor devices.

Figure 5:
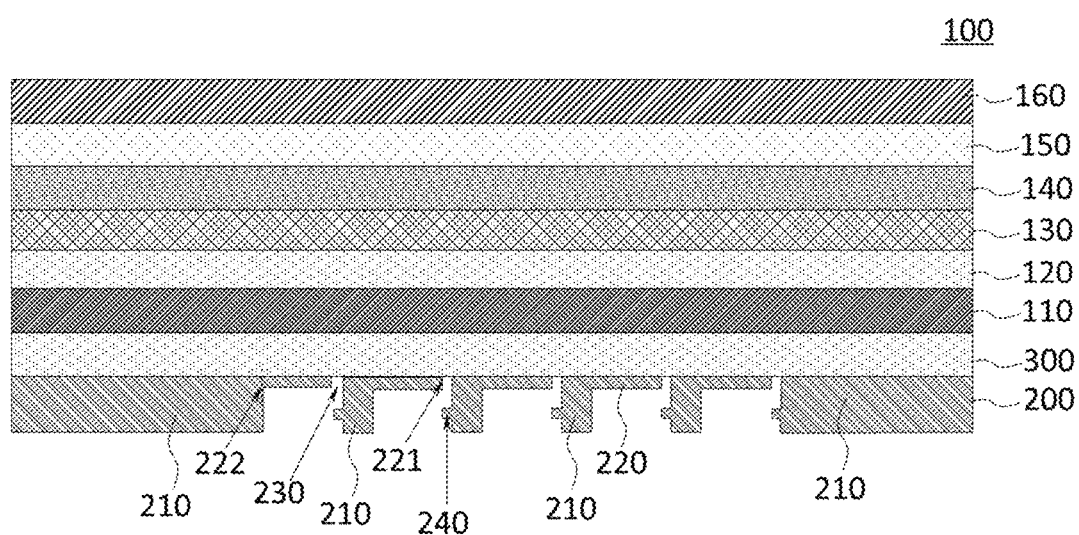
FIG. 5 is a cross-sectional view of another display panel provided by an embodiment of the present disclosure.

In some other embodiments of the present disclosure, as shown in FIG. 3 and FIG. 5, FIG. 5 is a cross-sectional view of another display panel provided by an embodiment of the present disclosure. It should be noted that the protection film shown in FIG. 5 can be understood as another protection film provided in FIG. 3, and the cross section in FIG. 5 can be understood as the cross section of a display panel obtained when the protection film is taken along the section AA in FIG. 3, and the direction of the cross section is perpendicular to the direction of the display panel. The repeating elements between the present embodiment and the above embodiments will not be described herein. The difference is that the side of the main portion 210 of the protection film 200 close to the hollow area 230 is provided with a protrusion 240 extending towards the hollow area 230. In addition, the protrusion 240 overlaps the hollow area 230.

In an embodiment, the cover 220 has a first edge 221 disconnected from the main portion 210 and a second edge 222 connected to the main portion 210. The part of the main portion 210 opposite to the first edge 221 is provided with a protrusion 240 at a side wall of the hollow area 230 formed by the main portion 210. The thickness of the cover 220 is smaller than the thickness of the main portion 210, a thickness of the protrusion 240 is smaller than the thickness of the main portion 210, and the protrusion 240 and the cover 220 adjacent to the protrusion 240 are located in different planes. That is, in a direction parallel to the plane of the display panel 100, the protrusion 240 and the cover 220 do not overlap.

In an embodiment, the plane of the cover 220 is on a side of the plane of the protrusion 240 facing towards the basic display panel.

Through the present embodiment, while having the technical effects of the above embodiments, the light-shielding ability of the protection film can be further improved to avoid light leakage. In addition, the present embodiment can also prevent glue overflow as much as possible while preventing the film from colliding and squeezing.

In some other embodiments of the present disclosure, the cover 220 and the protrusion 240 are formed into one piece with the connected main portion 210. In other words, the main portion 210 can be regarded as having a large hollow-like opening. The cover 220 and the protrusion 240 are located in the opening, and extend from a side wall of the main portion 210 at the opening towards the inside of the opening, which can further improve the stability of the structure of the protection film.

In an embodiment, the protrusion 240 completely covers the corresponding hollow area 230. In other words, the orthographic projection of the protection film 200 on the substrate 110 has no hollow area. In other words, in the direction perpendicular to the display panel, the protection film can form a non-transmissive plane, which improve the light-shielding effect of the protection film.

In an embodiment, the protrusion 240 is formed only in a straight side area of the hollowed area 230, so the shape of the protrusion 240 can be regarded as a cube or a cuboid extending along the straight side of the hollow area 230. In this way, the collision between the protrusion 240 and the cover 220 is avoided while ensuring the reduction of light leakage.

Figure 6:
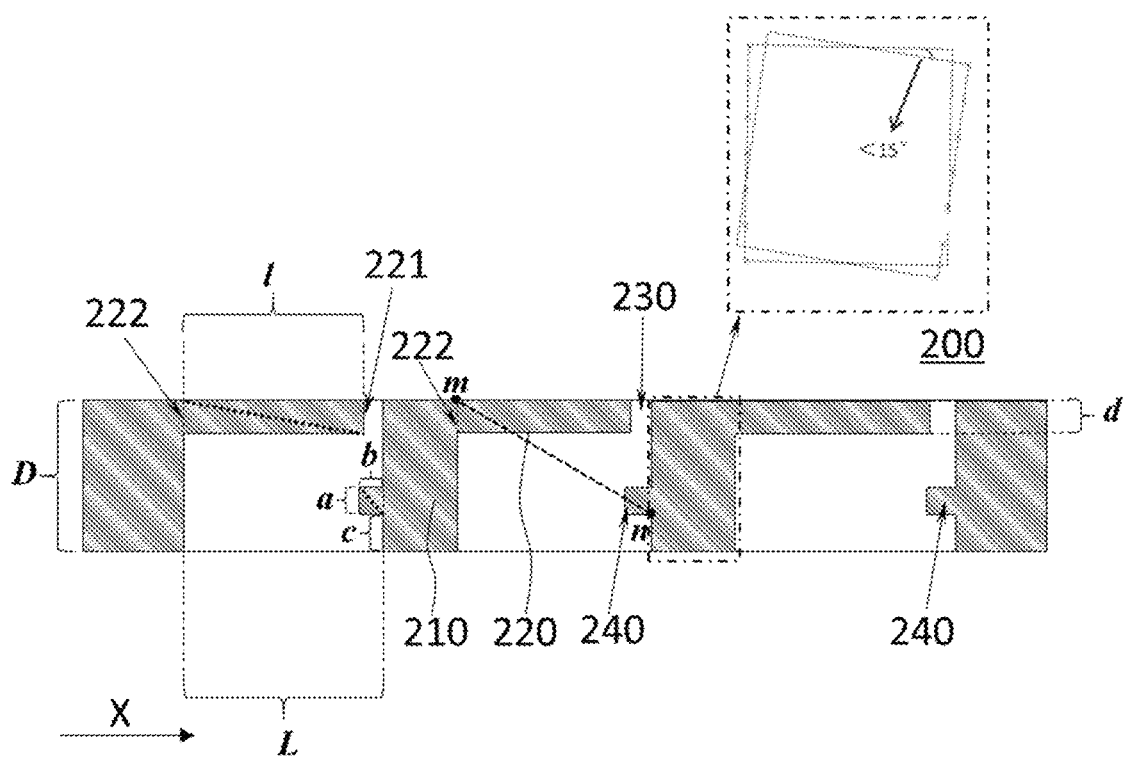
FIG. 6 is a partially enlarged view of a protection film in FIG. 5.

As shown in FIG. 5 and FIG. 6, FIG. 6 is a partially enlarged view of a protection film in FIG. 5. It should be noted that for the convenience of viewing, in FIG. 6, the reference numerals and size indications are placed on the different covers and protrusions. However, in this embodiment, the proportions of the cover and the protrusion can be common.

In an embodiment, a denotes the thickness of the protrusion 240, b denotes a length of the protrusion 240 in a first direction X, d denotes the thickness of the cover 220, l denotes a length of the cover 220 in the first direction X, c denotes a distance between the bottom surface of the main portion and a position where the protrusion 240 and the main portion 210 are connected, that is, the distance between the bottom surface of the protrusion 240 and the bottom surface of the main portion 210.

$$A = \sqrt{(l^2 + d^2)} + \sqrt{(a^2 + b^2)}, B = \sqrt{(D-c)^2 + L^2},$$

In the research on how to further improve the reliability of the protection film, it is found that the deformation of the metal rib (that is, the main portion 210) is generally a slight distortion. As shown in the dotted box in FIG. 6, the metal rib is relatively twisted in a center-symmetrical manner. Although as the metal rib is twisted and deformed, the occupied length of the "cover" (that is, the cover 220) in the first direction X is a little more than that of the diagonal of the "cover", it is found that according to the simulation results of the twisted angle, the twist angle is not large (generally smaller than 15°). Therefore, the impact factor of the length occupied by the "cover" in the first direction X is mainly the deformation of the "cover", and the details are as follows.

The "cover" (i.e., the cover 220) can be displaced during the bending and deformation of the metal rib (i.e., the main portion 210). In the cross-sectional view of the protection film 200, the shape of the cover is approximately equivalent to a rectangle. Therefore, even if the displacement occurs, the maximum occupied length of the "cover" in the first direction X will not exceed that of the diagonal (shown by the dashed line on the cover 220 in FIG. 6) of the cover, that is, $\sqrt{(l^2+d^2)}$. In the same way, even if the "baffle" (that is, the protrusion 240) is displaced, its occupied length in the first direction X is at most equal to $\sqrt{(a^2+b^2)}$ (that is, as shown by the dashed line on the protrusion 240 in FIG. 6). Therefore, "A" represents a sum of the maximum length of the "cover" and the maximum length of the "baffle".

B represents a distance from a position of a point (that is, the point n) where the "cover" and the main portion 210 are connected to a position where a point (that is, the point m) where the "baffle" and the main portion 210 are connected. The distance between the dashed line n and the dashed line m is a distance between the "cover" and the "baffle", which allows the "cover" and the "baffle" are located in the "nm" direction without pressing against each other.

According to the present embodiment, A is smaller than B, that is, a sum of a length of the dotted line on the protrusion 240 in FIG. 6 and a length of the dotted line on the cover 220 in FIG. 6 is smaller than a length of the dotted line nm. In this way, when the protection film 200 is bent, if a direction of the maximum length of the "cover" and a direction of the maximum length of the "baffle" are the same as the direction of the dotted line nm, the collision between the "cover" and the "baffle" can also be avoided, and the stability and security of the structure of the protection film are improved.

It should be noted that the first direction X in the present embodiment is a direction parallel to the plane of the protection film 200 and perpendicular to a bending axis of the protection film 200 (the bending axis will be described in detail below). In other words, the first direction X is parallel to the plane of the protection film 200 and parallel to a direction from the cover 200 to the protrusion 240. It can also be understood in conjunction with FIG. 18 below that the first direction X is the direction in which the distance between the first edge 221 of the cover 210 and the main portion 210 opposite to the cover 210 by an interval is the smallest. The term thickness used in the present embodiment is a thickness in the direction perpendicular to the plane of the protection film 200.

In an embodiment, A/B<0.95. That is, $$\frac{\sqrt{(l^2 + a^2)} + \sqrt{(a^2 + b^2)}}{\sqrt{(D-c)^2 + L^2}} < 0.95.$$

Based on testing the covers in different regions, it is found that the protection film has different requirements for the covers in different regions, and then it is obtained through research that a safety threshold of A/B is 0.95. This is the "most stringent" and "safest" structural parameter that can be met in the area in greatest risk (it is found that the most risky area is the center of the bending area). The different structural parameter relationship limitations for the "cover" and the "baffle" in the region where the hollow area closer to the bending center area (the portion with a large bending curvature) and for the "cover" and the "baffle" in the region where closer to the non-bending area (the portion with a small bending curvature) are made, and then the safety threshold is obtained. The requirement for the whole protection film is made according to the "most stringent" requirement of the center of the bending area so as to ensure that any area of the protection film can have the ability to resist risks.

In an embodiment, $A/B \geq 0.5$, which can ensure that the "cover" performs its function while avoiding collisions during bending.

In an embodiment, $L \leq l+b$. That is, an orthographic projection of the "cover" on the plane of the protection film and an orthographic projection of the "baffle" on the plane of the protection film overlap. In this way, the opening of the main portion of the protection film can be blocked as much as possible, and the light leakage can be reduced while ensuring the solution of the bending problem.

In an embodiment, the structure of the "cover" is located on the outermost surface where the opening of the main portion is in contact with the optical clear adhesive. The "cover" is not completely closed. The "cover" has an area slightly smaller than an area of the opening of the main portion, and a shape scaling down a shape of the opening of the main portion. One side of the "cover" and a side of the opening of the main portion are located on the same line.

Of course, in some other embodiments of the present disclosure, when the protection film is bonded to the basic display panel through the adhesive layer, for the adhesive material with a greater fluidity, A is greater than B. In this way, when the bending causes the overflow of the OCA, the cover turns outwards towards the side facing away from the basic display panel to provide an accommodating space for the overflowed adhesive. Since A is greater than B, the cover and the baffle will eventually press against each other and form an enclosed space. That is, the enclosed space provides space for overflowed adhesive, and also prevents adhesive material from polluting other films.

Figure 7:
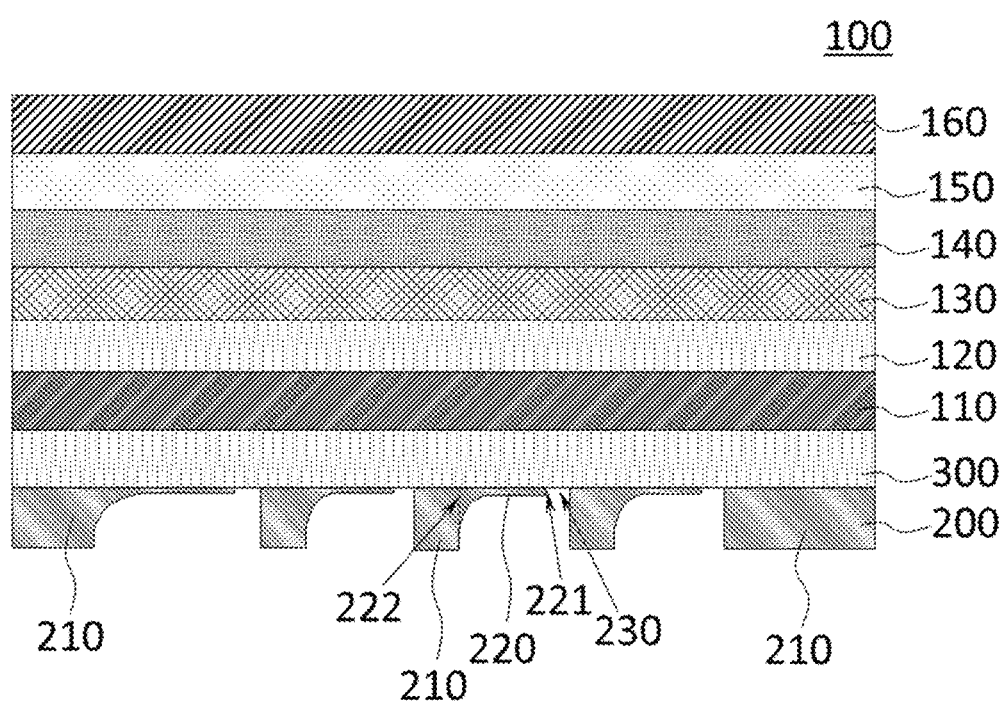
FIG. 7 is a cross-sectional view of another display panel provided by an embodiment of the present disclosure.

In some other embodiments of the present disclosure, as shown in FIG. 3 and FIG. 7, FIG. 7 is a cross-sectional view of another display panel provided by an embodiment of the present disclosure. It should be noted that the protection film shown in FIG. 7 can be understood as another protection film provided in FIG. 3, and the cross section of FIG. 7 can be understood as the cross section of the display panel obtained when the protection film is taken along the section A-A in FIG. 3, and the cross-sectional direction is perpendicular to the direction of the display panel. Compared with the above embodiments, in an embodiment, the thickness of the part of the cover 220 close to a position where the cover 220 is connected to the main portion 210 is greater than a thickness of the part of the cover 220 close to the first edge 221.

In an embodiment, the cover 220 has a first edge 221 that is disconnected from the main portion 210 and a second edge 222 that is connected to the main portion 210. A thickness of the cover 220 at the second edge 222 is greater than a thickness of the cover 220 at the first edge 221, and the thickness is in a direction perpendicular to the plane of the protection film or perpendicular to the plane of the substrate. In other words, a chamfer is formed at the position where the cover 220 and the main portion 210 are connected. In an embodiment, the chamfer can be flat or curved.

Through the present embodiment, by increasing the thickness of the cover at the position where the cover and the main portion 210 are connected, the structural stability and the bending resistance can be improved, and the direct fracture of the cover and the main portion caused by multiple times of bending can be avoided. In addition, in this embodiment, the thickness of the cover is increased along the direction from the first edge to the second edge so as to increase the degree of difficulty in bending the cover along the direction from the first edge to the second edge. Different degrees allow the cover to match different release degrees. For example, when the bending degree is small, the strength of the bending can only bend the thinner part of the cover, and the thinner part of the cover is closer to the first edge of the cover. Since the first cover is located at a position where the cover and the main portion are not fixed, the opening degree of the cover will be smaller, and thus the possibility of external dust entering, light leakage, and adhesive overflow can be minimized with sufficiently relieving the stress. In addition, the present embodiment also avoids the stress concentration at the position where the cover and the main portion are connected, and avoids a scenario when every time the display panel is bent or the display panel is bent to different degrees, the cover is bent at the position where the cover and the main portion are connected. Thereby, the service life of the protection film is increased.

In an embodiment, along the direction from the second edge 222 to the first edge 221, the thickness of the cover 220 gradually increases. In an embodiment, the top surface of the cover is still in the same plane with the top surface of the main portion, and the bottom surface of the cover gradually slopes towards the top surface of the cover along the direction from the second edge 222 to the first edge 221, and gradually approaches the top surface of the cover. In an embodiment, the cover 220 is formed with a concave arc surface on the bottom surface of the cover, that is, the bottom surface of the cover is concave towards the top surface of the cover. In other words, along the direction from the second edge 222 to the first edge 221, the slope of the bottom surface of the cover with respect to the direction perpendicular to the plane of the substrate 110 gradually decreases. The cover configured in this manner has the advantages of the cover described above. In addition, the bottom surface of the cover is formed with a concave surface, which can provide guidance for the bending of the cover. If adhesive overflows, the cover can be guided to bend downward through the concave surface to release a certain amount of space to accommodate the overflowed adhesive, and the overflowed adhesive caused by the bending of the display panel is prevented from affecting other parts, and the bending stress can be relieved by releasing space for the overflow adhesive.

Figure 8:
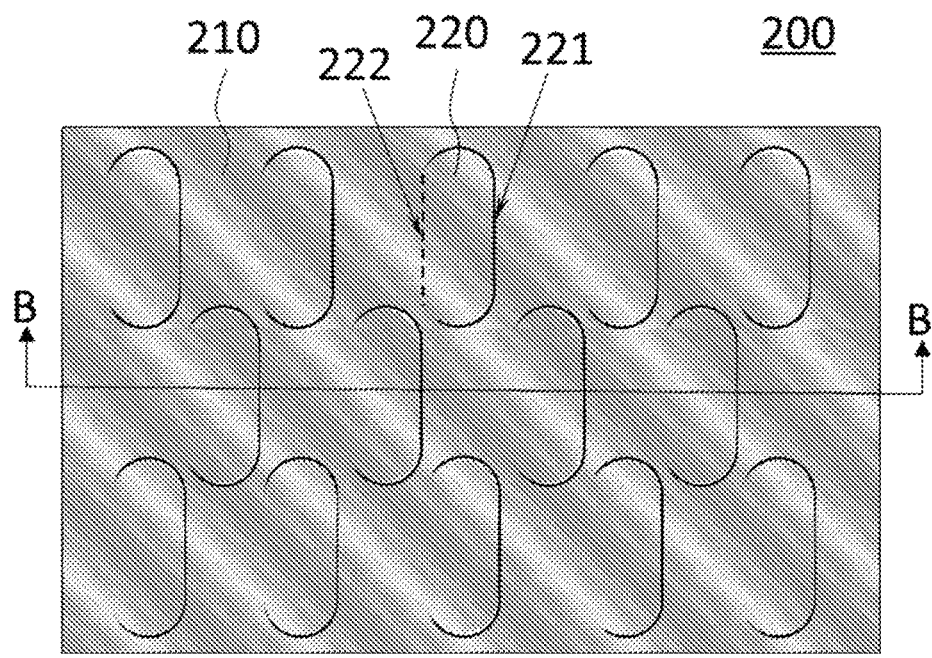
FIG. 8 is a top view of another protection film provided by an embodiment of the present disclosure.
Figure 9:
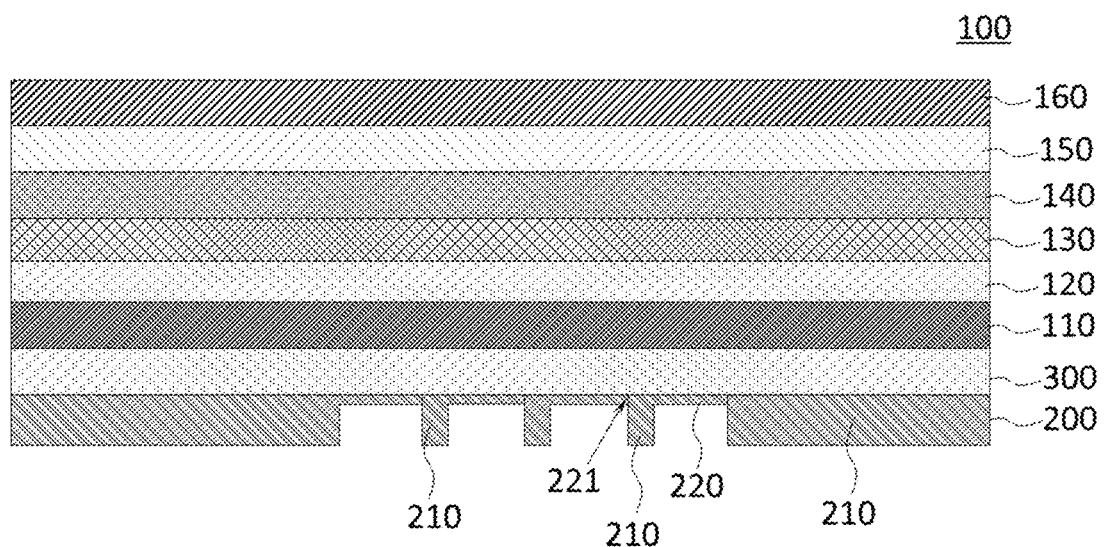
FIG. 9 is a cross-sectional view of another display panel provided by an embodiment of the present disclosure.

In some other embodiments of the present disclosure, as shown in FIG. 8 and FIG. 9, FIG. 8 is a top view of another protection film provided by an embodiment of the present disclosure, FIG. 9 is a cross-sectional view of another display panel provided by an embodiment of the present disclosure. It should be noted that the protection film shown in FIG. 9 can be understood as a protection film provided in FIG. 8, and the cross section of FIG. 9 can be understood as a cross-sectional view of a display panel obtained when the protection film is taken along the section B-B in FIG. 8, and the cross-sectional direction is perpendicular to the direction of the display panel.

The similarities between the present embodiment and the above embodiments will not be described herein.

Differently, when the protection film 200 is flattened, the first edge of the cover is in contact with the main portion.

In the present embodiment, the cover 220 includes a first edge 221 that is not fixed to the main portion 210 and a second edge 222 that is connected to the main portion 210. Although the first edge 221 and the main portion 210 are not fixed, they are in contact with each other in a non-bending state. That is, the contour of the first edge 221 is in contact with the edge of the main portion 210 adjacent thereto. An orthographic projection of an opening formed by the main portion 210 on the substrate and an orthographic projection of the cover 220 on the substrate are consistent in shape and sizes. The top surface of the main portion of the main portion 210 and the top surface of the cover 220 together form the top surface of the protection film 200, and this top surface is a non-hollowed whole surface. However, when the protection film 200 is bent, the first edge 221 of the cover 220 can be relatively displaced or separated from the main portion 210. Through the present embodiment, the protection film can have a complete bearing surface, and can also avoid light leakage, overflow of adhesive, and entering impurities.

Figure 10:
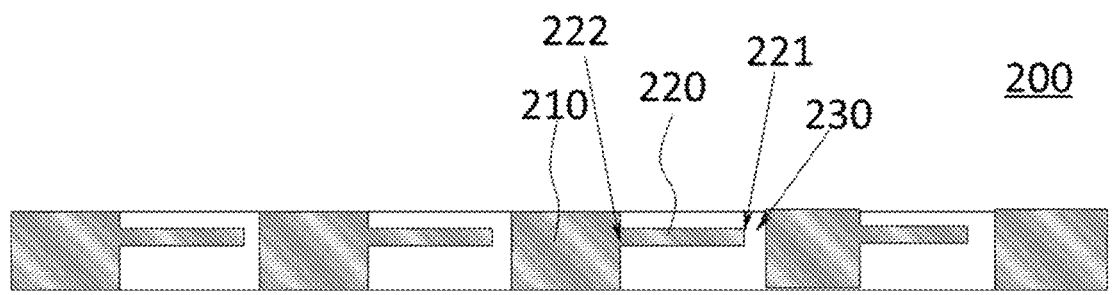
FIG. 10 is a cross-sectional view of another protection film provided by an embodiment of the present disclosure.

In some other embodiments of the present disclosure, as shown in FIG. 10, FIG. 10 is a cross-sectional view of another protection film provided by an embodiment of the present disclosure. It should be noted that if there is no conflict, the cross-section of the protection film shown in FIG. 10 can be understood as a cross-sectional view that is taken along the cross-sectional line of any top view of the protection film of the present disclosure, and the cross-sectional direction is perpendicular to the direction of the display panel. The similar features between this embodiment and the above embodiment will not be discussed herein.

In an embodiment, the top surface of the cover 220 and the top surface of the main portion 210 are located on different planes. For example, the cover 220 is located in the opening formed by the main portion 210. In this way, the cover 220 can provide space for overflowed adhesive and prevent the adhesive material from polluting other films, and when overflow of OCA is caused by bending, there is a certain space in advance to accommodate the overflowed OAC, avoiding excessive squeezing of the OCA, and relieving stress more efficiently and quickly.

Figure 11:
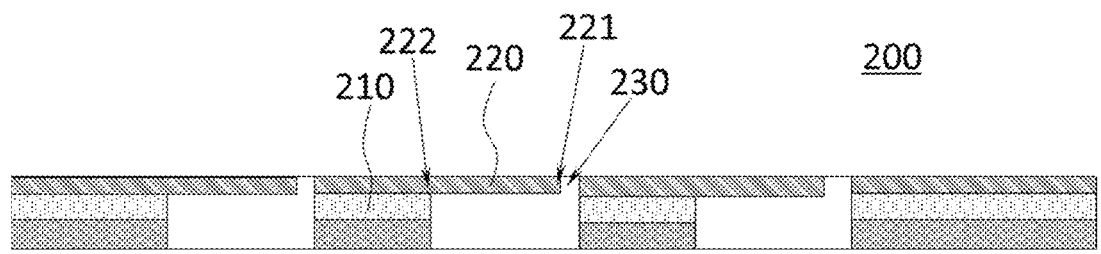
FIG. 11 is a cross-sectional view of another protection film provided by an embodiment of the present disclosure.

In some other embodiments of the present disclosure, as shown in FIG. 11, FIG. 11 is a cross-sectional view of another protection film provided by an embodiment of the present disclosure. It should be noted that if there is no conflict, the cross-section of the protection film shown in FIG. 11 can be understood as a cross-sectional view that is taken along the cross-sectional line of any top view of the protection film of the present disclosure, and the cross-sectional direction is perpendicular to the direction of the display panel. Similar features between this embodiment and the above embodiment will not be discussed herein.

In an embodiment, the main portion 210 includes a plurality of sub-layers, and the cover 220 and at least one sub-layer of the protection film 200 are formed into one piece, that is, they are made in the same layer and of the same material.

In an embodiment, the cover 220 is formed into one piece with an outermost sub-layer of the protection film 200.

Figure 12:
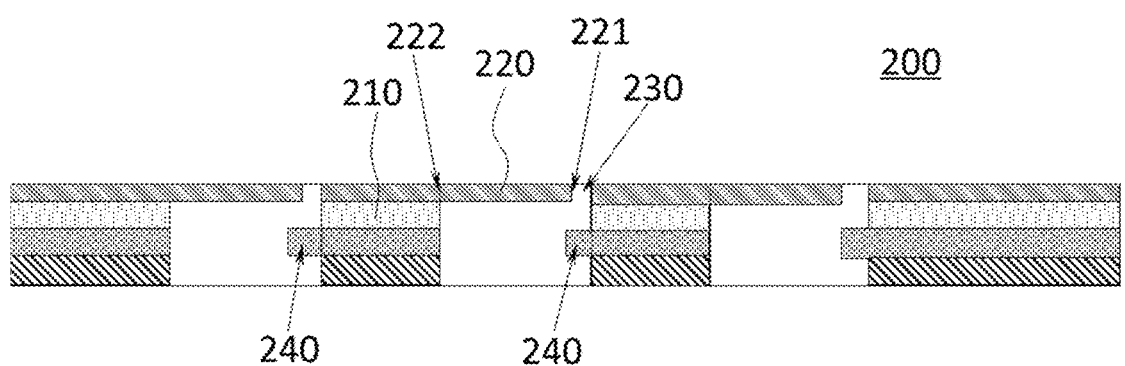
FIG. 12 is a cross-sectional view of another protection film provided by an embodiment of the present disclosure.

In some other embodiments of the present disclosure, as shown in FIG. 12, FIG. 12 is a cross-sectional view of another protection film provided by an embodiment of the present disclosure, the protection film 200 further includes a protrusion 240, and the protrusion 240 is formed into one piece with at least one sub-layer of the main portion 210.

In an embodiment, the protrusion 240 is formed into one piece with a sub-layer of the protection film 200 that is not the outermost sub-layer.

In an embodiment, the protrusion 240 and the cover 220 are located in sub-layers that are not adjacent to each other, which can provide a certain reserved space for the deformation between the protrusion 240 and the cover 220 during bending, and avoid the abutting or collision between the protrusion 240 and the cover 220.

Figure 13:
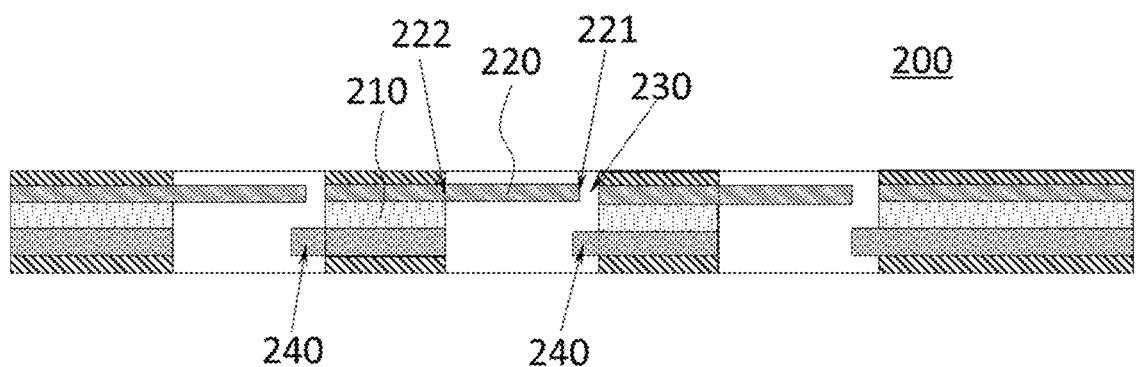
FIG. 13 is a cross-sectional view of another protection film provided by an embodiment of the present disclosure.

In some other embodiments of the present disclosure, as shown in FIG. 13, FIG. 13 is a cross-sectional view of another protection film provided by an embodiment of the present disclosure. Different from the above embodiments, the cover 220 and the sub-layer of the protection film 200 that is not the outermost sub-layer are formed into one piece, that is, the top surface of the cover 220 and the top surface of the main portion 210 are located in different planes. The cover 220 is located in the opening formed by the main portion 210. In this way, it can provide space for overflowed adhesive and prevent the adhesive material from polluting other films, and when overflow of OCA is caused by bending, there is a certain space in advance to accommodate the overflowed OAC, avoiding excessive squeezing of the OCA, and relieving stress more efficiently and quickly.

Through the above embodiments, the protrusion and the cover reuse a sub-layer of the main portion. In this way, on the one hand, the manufacturing process can be simplified, and on the other hand, the bending reliability of the protection film is improved.

It should be noted that each of the protrusion and the cover in the above embodiments only reuses one sub-layer of the main portion. Of course, according to needs, in some other embodiments, each of the protrusion and the cover can reuse multiple sub-layers of the main portion, which is not repeated herein.

Figure 14:
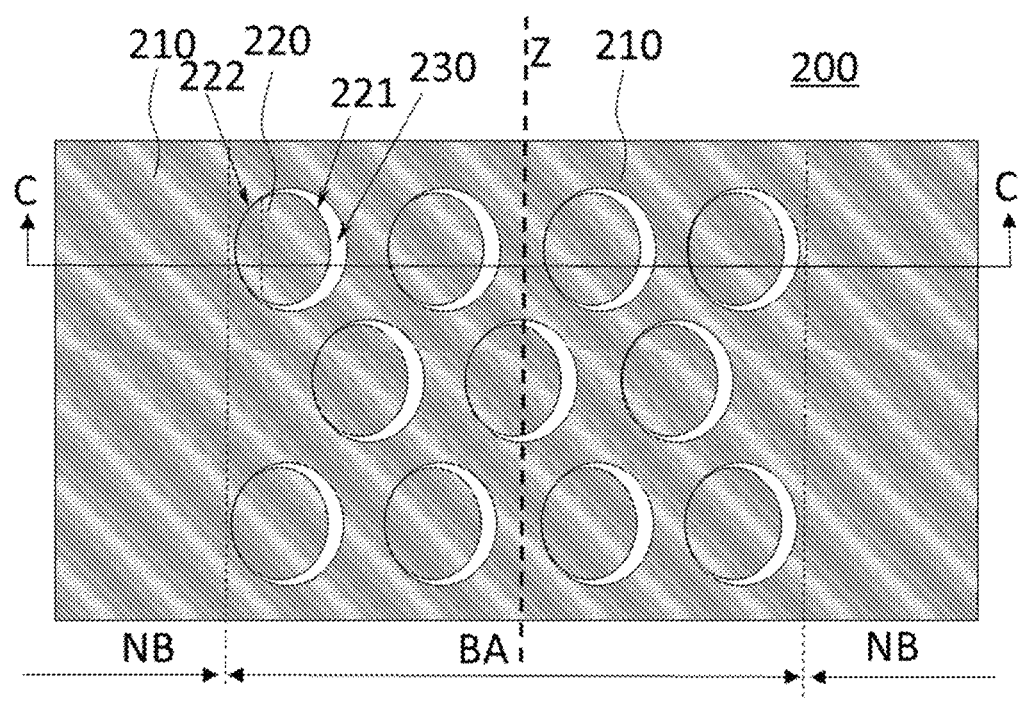
FIG. 14 is a top view of another protection film provided by an embodiment of the present disclosure.
Figure 15:
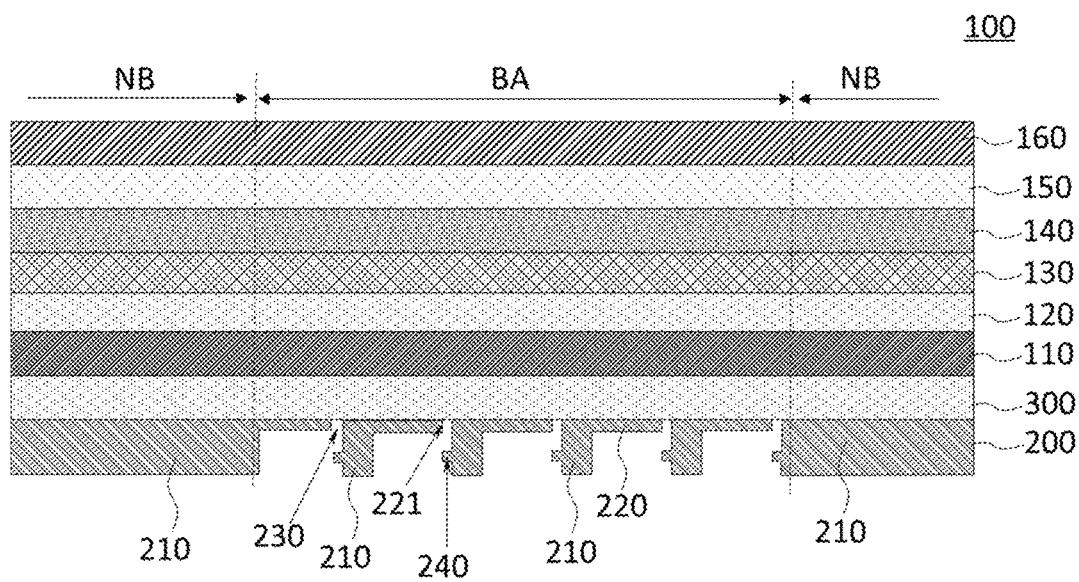
FIG. 15 is a cross-sectional view of another display panel provided by an embodiment of the present disclosure.

In some other embodiments of the present disclosure, as shown in FIG. 14 and FIG. 15, FIG. 14 is a top view of another protection film provided by an embodiment of the present disclosure, and FIG. 15 is a cross-sectional view of another display panel provided by an embodiment of the present disclosure. The relationship between FIG. 14 and FIG. 15 is similar to the relationship between FIG. 3 and FIG. 4. FIG. 15 is a cross-sectional view taken along the section C-C in FIG. 14, and will not be repeated here. Similar features between this embodiment and the above embodiment will not be discussed herein.

In an embodiment, the protection film 200 is flexible, the display panel 100 is a flexible display panel, and the display panel 100 has a bending area BA. In an embodiment, the display panel 100 further has a non-bending area NB respectively located on two sides of the bending area BA.

In an embodiment, the protection film 200 is provided with a cover 220 corresponding to the bending area BA, and in the non-bending area NB of the protection film 200, only the main portion 210 is provided, and no cover 220 is provided any more.

In other embodiments of the present disclosure, the display panel is bendable over the entire surface, that is, the entire surface of the display panel is a bending area. The cover of the protection film bonded to the display panel can be evenly distributed over the entire area of the protection film.

In an embodiment, with reference to FIG. 14 again, the protection film 200 has a bending axis Z. The bending axis Z can be understood as an axis that the protection film 200 surrounds when the protection film 200 is bent, and can also be understood as an axis parallel to the crease during the bending. The bending axis Z can be a virtual line, not a physical structure. In an embodiment, the bending axis Z of the protection film 200 can be the bending axis Z along which the display panel 100 is bent.

In an embodiment, the first edge 221 surrounds the cover 220 in a non-closed manner. The line connecting two ends of the first edge 221 is not perpendicular to the bending axis Z.

It can be understood that, in an embodiment, the cover 220 is circular, the first edge 221 is an arc and the hollow part is crescent-shaped.

It should be noted that, the embodiment of FIG. 14 is described with the cover being a circle. In other embodiments of the present disclosure, the cover can be in a shape of a strip, a rectangle, or any polygon or polygon with rounded corners.

Figure 16:
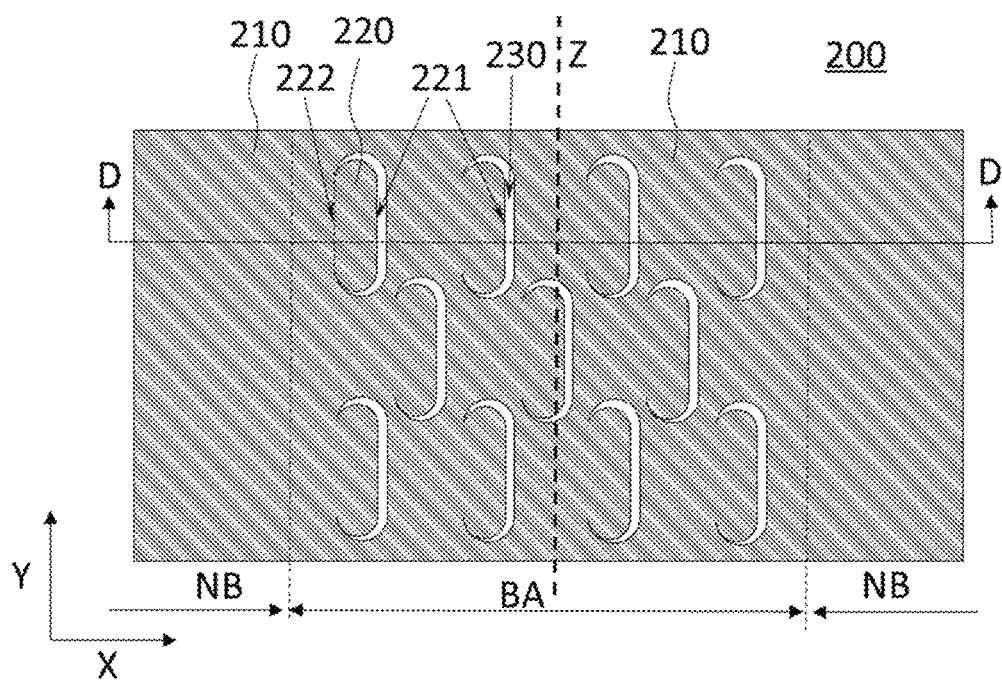
FIG. 16 is a top view of another protection film provided by an embodiment of the present disclosure.

It should be noted that the line connecting the two ends of the first edge 221 is shown by the dashed line in FIG. 14. In other embodiments of the present disclosure, as shown in FIG. 16 below, the line connecting the two ends of the first edge 221 is the second edge 222, in other words, the position where the cover 220 and the main portion 210 are connected or the boundary (i.e., the second edge 222) is not perpendicular to the bending axis Z.

In an embodiment, the second edge 222 is a non-closed loop line that surrounds the cover in a non-closed manner. In other embodiments of the present disclosure, as shown in FIG. 16, the second edge 222 is a straight line.

In an embodiment, the line connecting the two ends of the first edge 221 is parallel to the bending axis Z.

It should be noted that, in the embodiment of the present disclosure, the first edge 221 is a non-straight line for illustration. In some embodiments, the first edge can be a straight line. In an embodiment, the first edge and the main portion are not fixed but in contact with each other, that is, the cover and the main portion are separated by only a gap of the first edge.

According to the present embodiment, the direction of the first edge is designed in combination with the bending direction, so the first edge can better release the stress and guide the bending, the bending reliability of the protection film and the display panel is improved, and the service life is increased.

With reference to FIG. 14 and FIG. 16, in an embodiment, at least three non-co-linear points (i.e., the at least three points are not located on a same straight line) are located on an extension path of the first edge 221. In other words, the cover 220 is a peninsula structure protruding from the second edge 222 towards the side away from the second edge 222 (that is, towards the opening of the main portion 210). In the direction parallel to the plane of the protection film 200 and perpendicular to the bending axis Z, the first edge 221 includes at least two opposite parts, between which the cover 220 is sandwiched.

Through the present embodiment, the first edge is no longer a straight line, so that the cover can have a path for inverting, that is, the line connecting the two ends of the first edge can be the bending path, and the cover can be bent with respect to the bending path, and thus stress can be better relieved, and squeezing with the adhesive layer can be better avoided.

With reference to FIG. 14 and FIG. 16, in an embodiment, the hollow area 230 of the protection film 200 extends along the first edge 221 of the cover 220 and surrounds the cover 220 in a non-closed manner.

In an embodiment, the orthographic projection of the hollow area 230 on the plane of the protection film 200 is a strip, and an extension path of the strip is a non-closed loop. The line connecting the two ends of the strip-shaped hollow area 230 is not perpendicular to the bending axis Z. It can be understood that the line connecting the two ends of the strip-shaped hollow area 230 coincides with the second edge 222. Therefore, it is equivalent to that the connection of the cover 220 and the main portion 210 or the boundary (i.e., the second edge 222) is not perpendicular to the bending axis Z. In an embodiment, the line connecting the two ends of the strip-shaped hollow area 230 is parallel to the bending axis Z.

In an embodiment, at least three non-co-linear points are located on an extension path of the hollow area 230. In other words, the hollow area 230 is a non-straight strip.

In the embodiment, the hollow area 230 and the first edge match, and the hollow area is no longer a straight strip hollow, which on the one hand, facilitate the bending of the cover, and on the other hand, cause the bending has components at different directions. In the present embodiment, there can be hollow areas in many directions, and the problems, such as being against abuts caused by bending.

In an embodiment, a main part of the hollow area 230 is parallel to the bending axis Z. In other words, if the hollow area 230 is a straight strip, its extension direction is parallel to the bending axis Z; and if the hollow area 230 is a non-straight strip, for example, a zigzag line, or a combination of a straight line and an arc, and the like, the main part of the hollow area 230, that is, a longest part of the hollow area 230, is a straight part and the extension direction is parallel to the bending axis Z. The hollow area provided in the present embodiment can improve the bending reliability of the protection film or the display panel.

In some other embodiments of the present disclosure, as shown in FIG. 15 and FIG. 16, FIG. 16 is a top view of another protection film provided by an embodiment of the present disclosure. The relationship between FIG. 16 and FIG. 15 is similar to the relationship between FIG. 3 and FIG. 4. FIG. 15 is a cross-sectional view taken along the section D-D in FIG. 16, and will not be repeated herein. Similar features between this embodiment and the above embodiment will not be discussed herein.

In an embodiment, the extension direction of the cover 220 is not perpendicular to the bending axis Z.

In another embodiment, the extension direction of the cover 220 is parallel to the bending axis Z.

Through the present embodiment, while avoiding the shifting of the neutral layer of the bending area and slight moire abnormality in the display image and ensuring the adhesion ability of the protection film, the cover can be more suitable for bending, and the bending reliability of the protection film or display panel can be further improved.

In an embodiment, the shape of the cover 220 is an elongated strip with convex arcs at both ends or a rectangle with rounded corners.

Through the present embodiment, the cover is rounded and has no tip, wear is reduced, and the service life of the cover is prolonged.

In an embodiment, two ends of the cover 220, which are opposite in the first direction X, are convex arcs. In this way, the cover can be more suitable for bending, and the bending reliability of the protection film or the display panel can be further improved.

Figure 17:
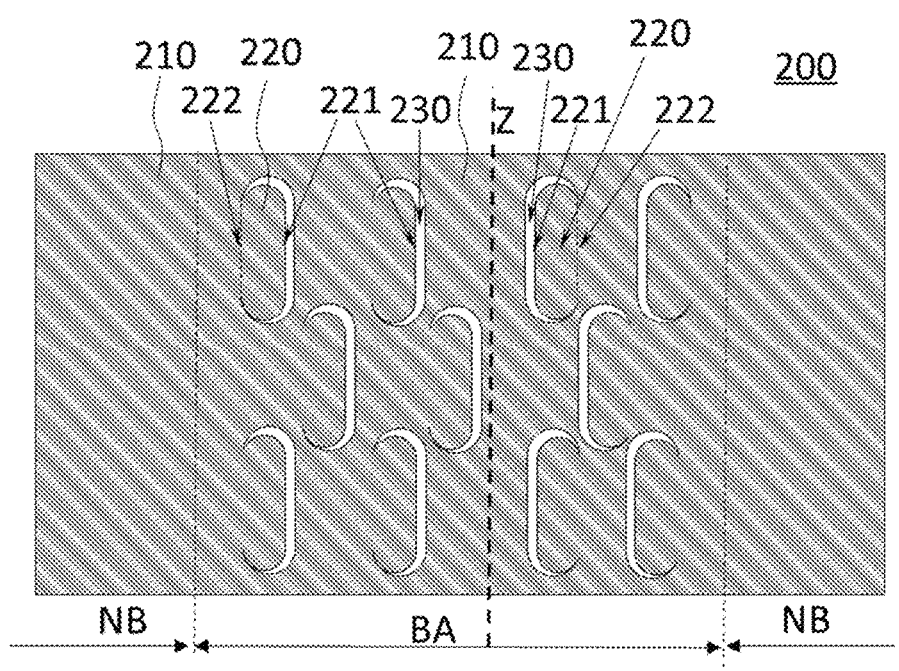
FIG. 17 is a top view of another protection film provided by an embodiment of the present disclosure.

In some other embodiments of the present disclosure, as shown in FIG. 17, FIG. 17 is a top view of another protection film provided by an embodiment of the present disclosure. Similar features between this embodiment and the above embodiment will not be discussed herein.

Differently, the opening of the cover 220 in an embodiment faces the bending center. The opening of the cover 220 is the side of the cover 220 facing the first edge 221.

In an embodiment, when the bending axis Z is equivalent to the bending line of the protection film or the display panel, the first edge 221 in the same cover 220 is located on the side of the second edge 222 facing the bending axis Z.

In an embodiment, at least two covers 220 are symmetrical about the bending axis Z.

In an embodiment, the second edge 222 of the same cover 220 is located on the side of the first edge 221 close to the non-bending area NB.

Through the present embodiment, the cover can react more sensitively to bending, and the bending stress can be relieved in a targeted manner at the first time.

Figure 18:
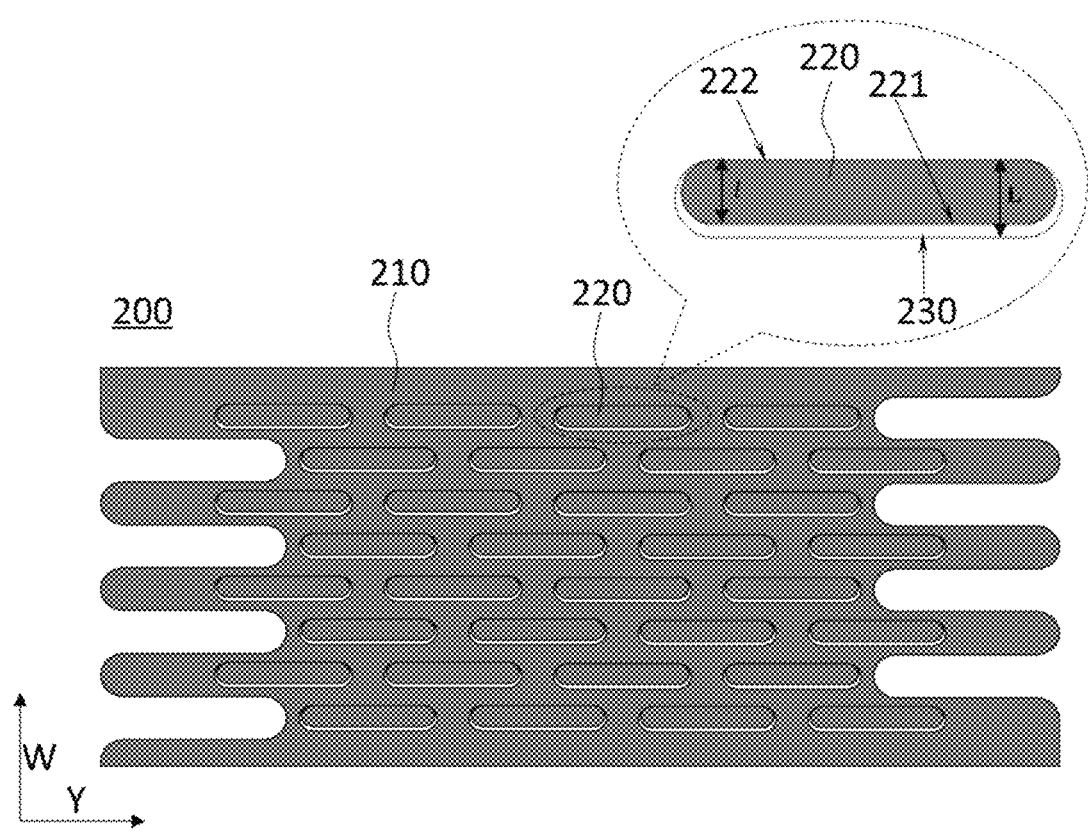
FIG. 18 is a top view of another protection film provided by an embodiment of the present disclosure.

In some other embodiments of the present disclosure, as shown in FIG. 18, FIG. 18 is a top view of another protection film provided by an embodiment of the present disclosure. Similar features between this embodiment and the above embodiment will not be discussed herein.

In an embodiment, the covers 220 are arranged along the second direction Y and staggered in the third direction W. The third direction W intersects the second direction Y. In an embodiment, the third direction W is perpendicular to the second direction Y.

In an embodiment, the covers 220 are aligned and arranged along the second direction Y, multiple columns of covers can be formed, the multiple columns extend along the second direction Y and are arranged along the third direction W. Each column includes a plurality of covers aligned along the second direction Y. In the third direction W, the cover 220 corresponds to the gap between two covers in the adjacent column. In other words, the covers 200 in the odd-numbered column are aligned in the third direction W, and the covers 220 in the even-numbered column are aligned in the third direction W.

The present embodiment can be combined with the above embodiments that are not conflicted with the present embodiment.

In an embodiment, the second direction Y is consistent with the extension direction of the cover 220.

In an embodiment, the second direction Y is consistent with the direction of the bending axis Z.

In an embodiment, if there is no conflict, the third direction W is consistent with the first direction X in the above embodiments.

Through the present embodiment, the staggered arrangement of the covers and the openings of the main portion in adjacent columns can make the stress distribution more uniform during bending. While ensuring the technical effects of the above embodiments, it can also improve the bending reliability of the protection film and the display panel.

Figure 19:
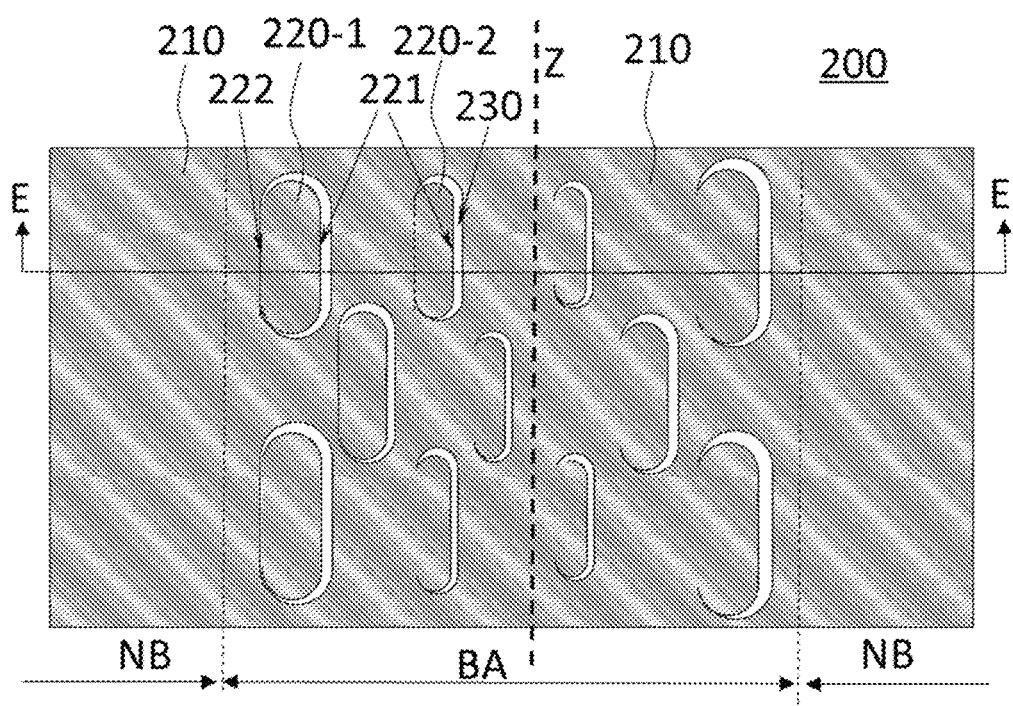
FIG. 19 is a top view of another protection film provided by an embodiment of the present disclosure.
Figure 20:
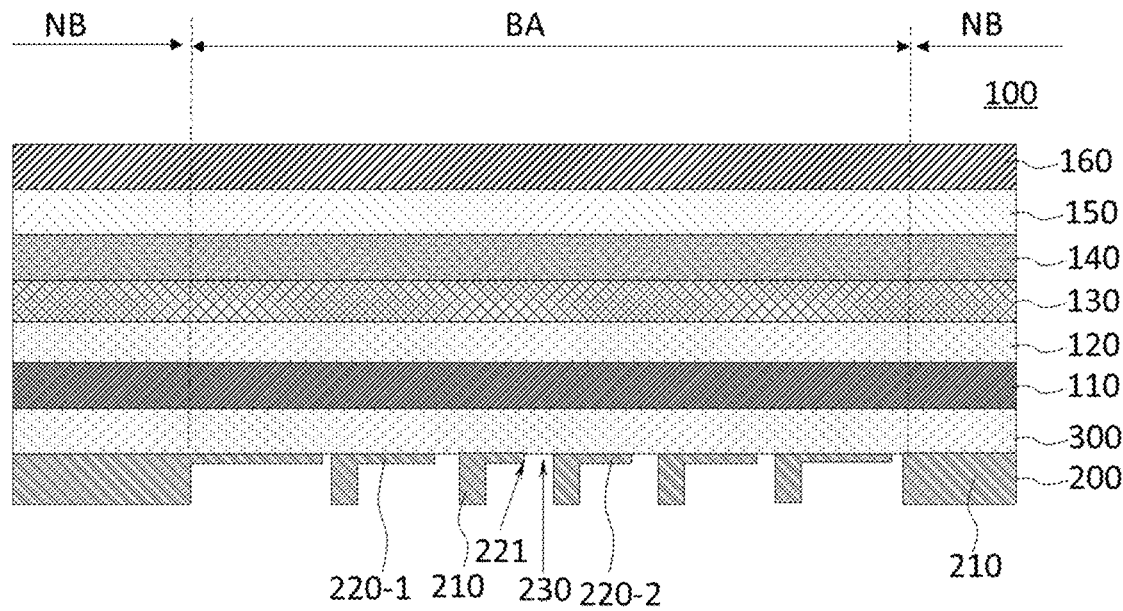
FIG. 20 is a cross-sectional view of another display panel provided by an embodiment of the present disclosure.

In some other embodiments of the present disclosure, as shown in FIG. 19 and FIG. 20, FIG. 19 is a top view of another protection film provided by an embodiment of the present disclosure, and FIG. 20 is a cross-sectional view of another display panel provided by an embodiment of the present disclosure. The relationship between FIG. 19 and FIG. 20 is similar to the relationship between FIG. 3 and FIG. 4. FIG. 20 is a cross-sectional view taken along the section E-E in FIG. 19. The similarities between the present embodiment and the above embodiments will not be repeated herein.

Differently, the covers 210 include a first cover 210-1 and a second cover 210-2, and an area of the first cover 210-1 is greater than an area of the second cover 210-2. When bending occurs, the bending degree of a region where the first cover 210-1 is located is smaller than the bending degree of area region where the second cover 210-2 is located.

Specifically, the bending degree can be understood as the radius of curvature during bending. The positional relationship between the first cover 210-1 and the second cover 210-2 can be one of the followings: the first cover 210-1 is located at a side of the second cover 210-2 facing away from the bending center; or, the first cover 210-1 is located at a side of the second cover 210-2 facing away from the bending axis or folding line; or, the second cover 210-2 is located at a side of the first cover 210-1 facing away from the non-bending area NB.

In an embodiment, a thickness of the first cover 210-1 is smaller than a thickness of the second cover 210-2. That is, from the non-bending area to the bending center, the thickness of the cover 210 gradually increases.

In an embodiment, the changing trend of the protrusion is opposite to the changing trend of the cover. In an embodiment, the protrusion includes a first protrusion and a second protrusion, and an area of the first protrusion is smaller than an area of the second protrusion. When the bending occurs, the bending degree of the region where the first protrusion is located is smaller than the bending degree of the region where the second protrusion is located. For the position relationship between the first protrusion and the second protrusion, reference can be made to the above description about the cover, which will not be repeated herein.

In an embodiment, the thickness of the first protrusion is smaller than the thickness of the second protrusion.

In an embodiment, the first cover is not provided with a corresponding protrusion. The second cover is provided with a corresponding protrusion. That is, the bending curvature of the area closer to the non-bending area is not so large, the cover can be larger, and the baffle can be smaller (even the baffle is not provided in some places, and the size/of the cover can be very close to the size L of the hollow hole).

In an embodiment, for multiple covers or multiple baffles arranged along a direction perpendicular to the bending axis (or a direction in which the bending degree gradually changes), the structure parameters of the multiple covers or multiple baffles can also be configured in a gradual change manner.

In an embodiment, for the protection film or display panel whose entire surface is bendable, the cover of the edge of the display panel or the protection film can be designed larger, and the protrusion baffle can be designed smaller, and the cover of the central area of the display panel or the protection film can be designed smaller and the protrusion can be designed larger. In the same way, the protrusion can be not provided in the edge area or even in some locations.

It should be noted that the thickness mentioned in the present embodiment refers to the thickness in the direction perpendicular to the plane of the protection film.

In some other embodiments of the present disclosure, in order to compensate the thickness change of the cover, the thickness of the protrusion is gradually reduced from the non-bending area to the bending center, that is, the thickness of the protrusion and the thickness of the cover change in opposite manners. In an embodiment, the thickness of the first cover is smaller than that of the second cover, and the thickness of the first protrusion is greater than the thickness of the second protrusion.

It should be noted that in the above embodiments of the present disclosure, if there is no conflict, the first direction X is the same in different embodiments; the second direction Y is the same in different embodiments; the bending axis Z is the same in different embodiments. In some embodiments, the first direction X and the bending axis Z can be regarded as the same direction. If there is no conflict, the first direction X in some embodiments is parallel to the cross-sectional direction in some embodiments described above.

Figure 21:
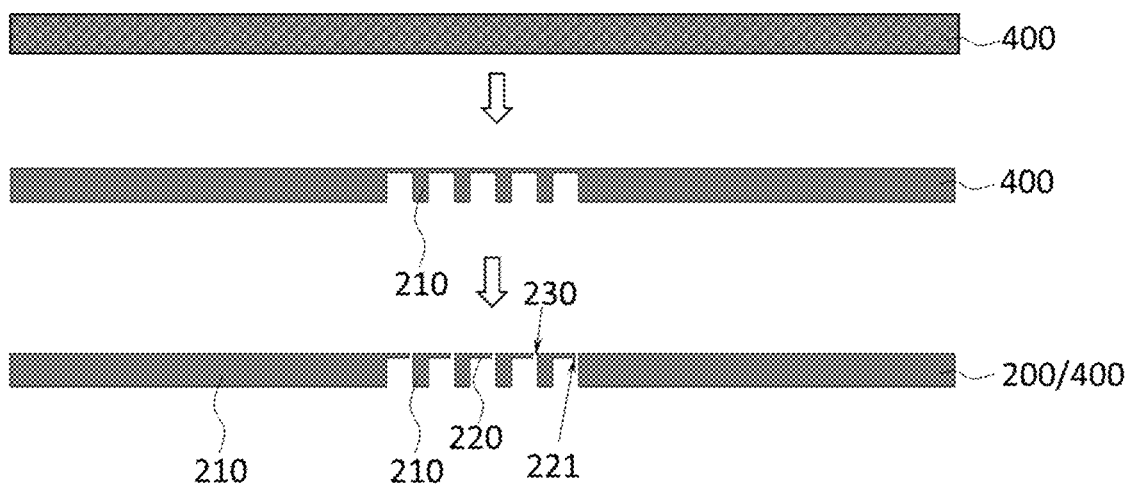
FIG. 21 is a flowchart of a manufacturing method of a protection film provided by an embodiment of the present disclosure.

The present disclosure also provides a manufacturing method of the protection film. As shown in FIG. 21, FIG. 21 is a flowchart of a manufacturing method of a protection film provided by an embodiment of the present disclosure. It should be noted that the following manufacturing flow shows a cross-sectional view of films, and the cross section is perpendicular to the plane of the film.

The manufacturing method includes the following steps.

First, a base material layer 400 is provided. In an embodiment, the base material layer 400 is stainless steel, namely SUS plate.

Next, laser engraving is performed on the base material layer 400 to form the first edge 221. In the present embodiment, through the laser engraving technology, the cover can be formed more accurately.

In an embodiment, before the laser engraving, a first side of the base material layer 400 is etched to form a non-through opening. The etched substrate 400 is a semi-finished product of the protection film 200. The formed non-through opening is a groove of the base material layer 400, and the bottom of the groove will be used to form the cover.

Next, the laser engraving is performed on a second side of the base material layer, and the laser engraving is performed at the non-through opening of the base material layer 400. That is, the bottom of the groove is punched by laser engraving, so that the first edge 221 is formed.

In an embodiment, in the laser engraving step, a hollow area 230 between the first edge 221 and the main portion 210 can also be formed at the non-through opening.

Figure 22:
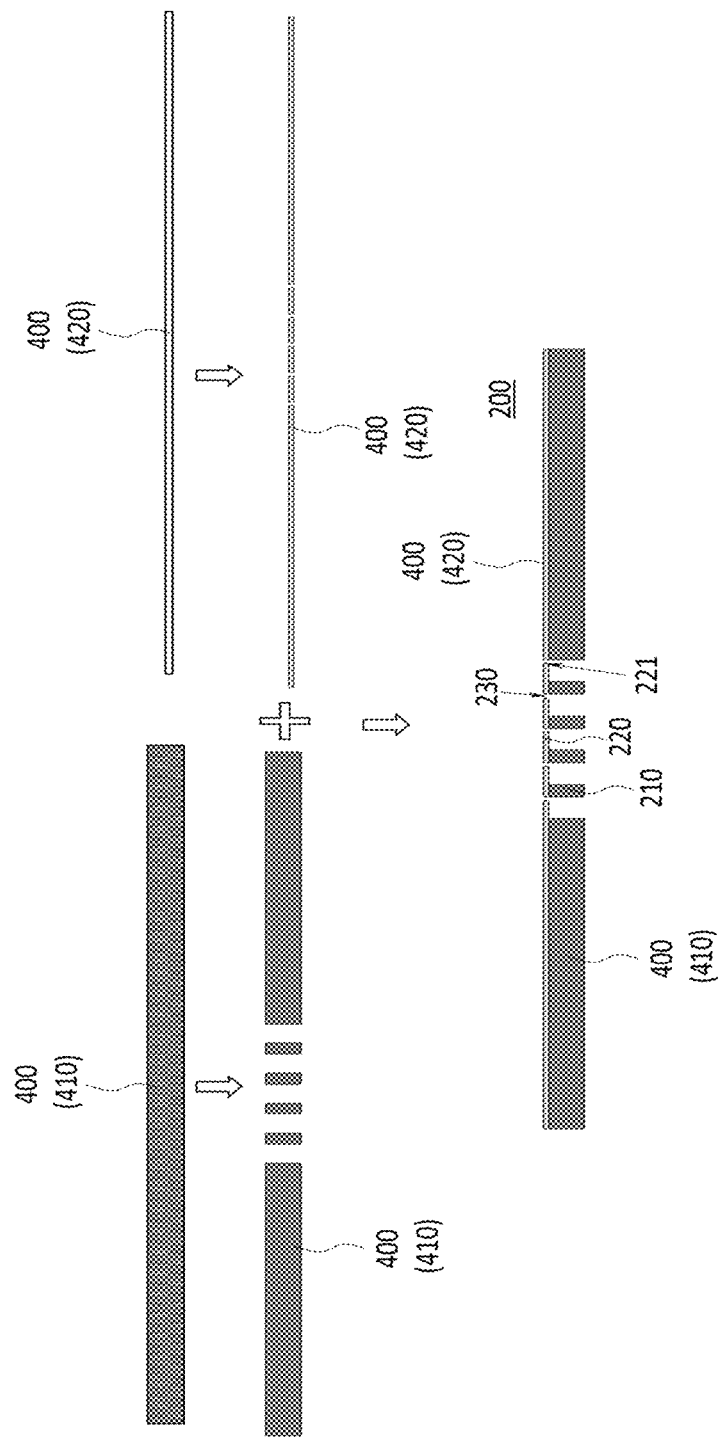
FIG. 22 is a flowchart of another manufacturing method of a protection film provided by an embodiment of the present disclosure.

In other embodiments of the present disclosure, as shown in FIG. 22, FIG. 22 is a flowchart of another manufacturing method of a protection film provided by an embodiment of the present disclosure.

In an embodiment, the step of providing the base material layer 400 includes: providing a first sub-substrate 410 and a second sub-substrate 420. In an embodiment, a thickness of the first sub-substrate 410 is greater than a thickness of the second sub-substrate 420, and a thickness direction is perpendicular to the plane of the protection film or the base material layer.

Next, the first sub-substrate 410 and the second sub-substrate 420 are processed.

In an embodiment, before the laser engraving, the first sub-substrate 410 is punched through by etching to form an opening.

Next, laser engraving is performed on the base material layer 400 to form the first edge 221. Specifically, laser engraving is performed on the second sub-substrate 420 to form the first edge 221 and a pre-hollow area. The pre-hollow area can be understood as a structure that can form part of the hollow area 230 subsequently.

Next, the first sub-substrate 410 and the second sub-substrate 420 are bonded together, and the first edge 221 corresponds to the opening formed by the above punch-through etching. The specific correspondence and pattern can be referred to the above protection film embodiment.

That is, in the present embodiment, when the bending area of a first thick SUS sheet is etched, the punch-through etching is performed to form a hollow, and then a shape of the hollow is obtained, a thin SUS sheet is provided, and laser engraving is performed on the thin SUS sheet to make a "cover" shape corresponding to the hollow of the thick SUS sheet, and finally the thin SUS sheet and thick SUS sheet are welded to obtain the protection film 200.

In other embodiments of the present disclosure, the first edge and a hollow can be formed by laser engraving on the second sub-substrate, and then a shape of the hollow is captured and the punch-through etching is performed on the second sub-substrate. Finally, the two sub-substrates are bonded together.

Figure 23:
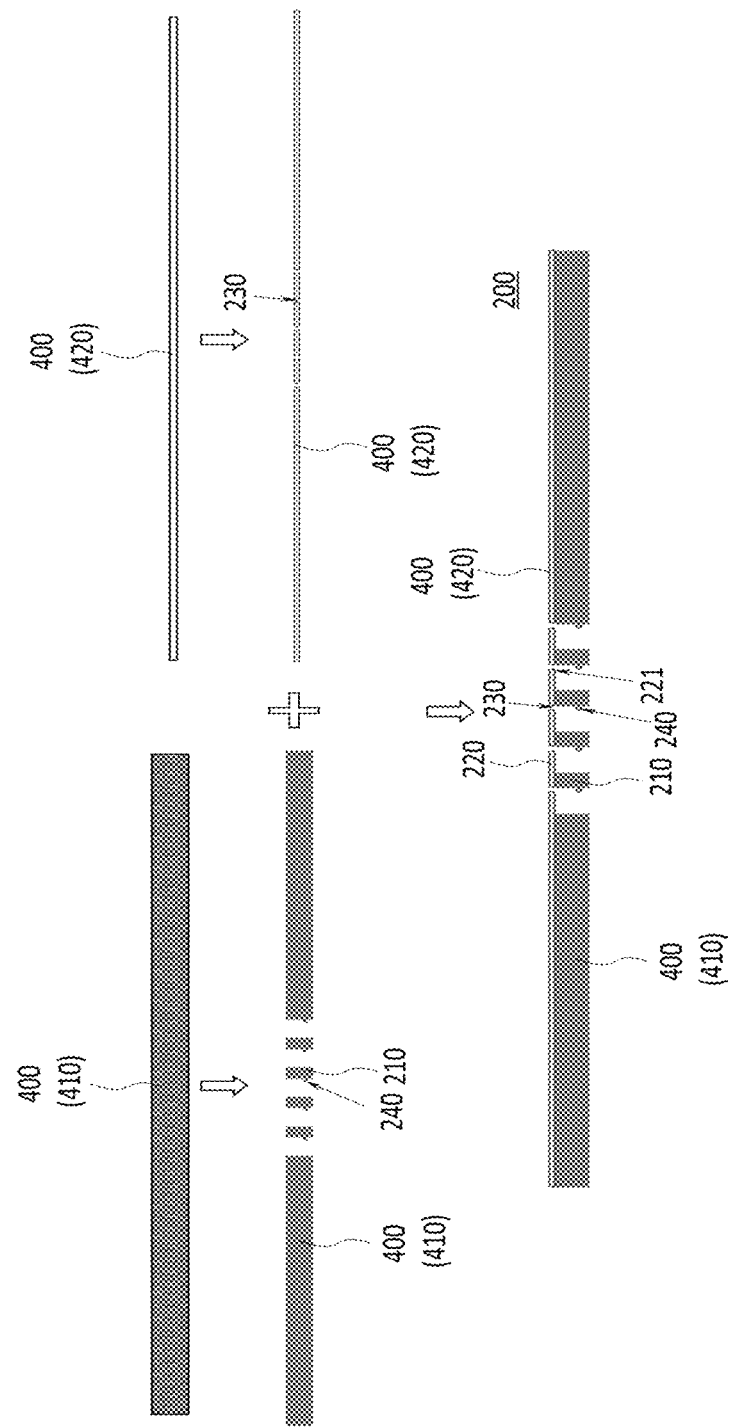
FIG. 23 is a flowchart of yet another manufacturing method of a protection film provided by an embodiment of the present disclosure.

In other embodiments of the present disclosure, as shown in FIG. 23, FIG. 23 is a flowchart of yet another manufacturing method of a protection film provided by an embodiment of the present disclosure.

The difference from the above embodiment is that the protection film manufactured in the present embodiment is provided with a protrusion.

In an embodiment, the step of providing the base material layer 400 includes: providing a first sub-substrate 410 and a second sub-substrate 420.

In an embodiment, a thickness of the first sub-substrate 410 ranges from 100 μm to 150 μm, and a thickness of the second sub-substrate 420 ranges from 10 μm to 40 μm.

Next, etching is performed on both sides of the first sub-substrate 410 to obtain a semi-finished first sub-substrate 410 having the protrusion 240.

Next, laser engraving is performed on the substrate 400 to form the first edge 221. Specifically, laser engraving is performed on the second sub-substrate 420 corresponding to the pattern of the first sub-substrate 410 to form the first edge 221 and the pre-hollow area. Then, the first sub-substrate 410 and the second sub-substrate 420 are bonded together. Specific correspondence and patterns can be referred to the above protection film embodiment.

In other words, in the present embodiment, the bending area on both sides of the thick SUS sheet (ranging from 100 μm to 150 μm) is etched to obtain a semi-finished product with a "baffle" structure (that is, the protrusion 240), and the shape of the hollow of the semi-finished first sub-substrate is obtained. Next, laser engraving is performed on a thin SUS sheet (ranging from 10 μm to 40 μm) to make a "cover" shape corresponding to the hollow of the thick SUS sheet, and finally the thin SUS sheet and the thick SUS sheet are welded to obtain the protection film 200.

In other embodiments of the present disclosure, the first edge and pre-hollow area can be formed by performing the laser engraving on the second sub-substrate, and then the shape of the hollow is obtained and both sides of the second sub-substrate are etched to obtain a semi-finished product with a "baffle" structure (that is, the protrusion 240), and finally the two semi-finished sub base material layers are bonded.

Figure 24:
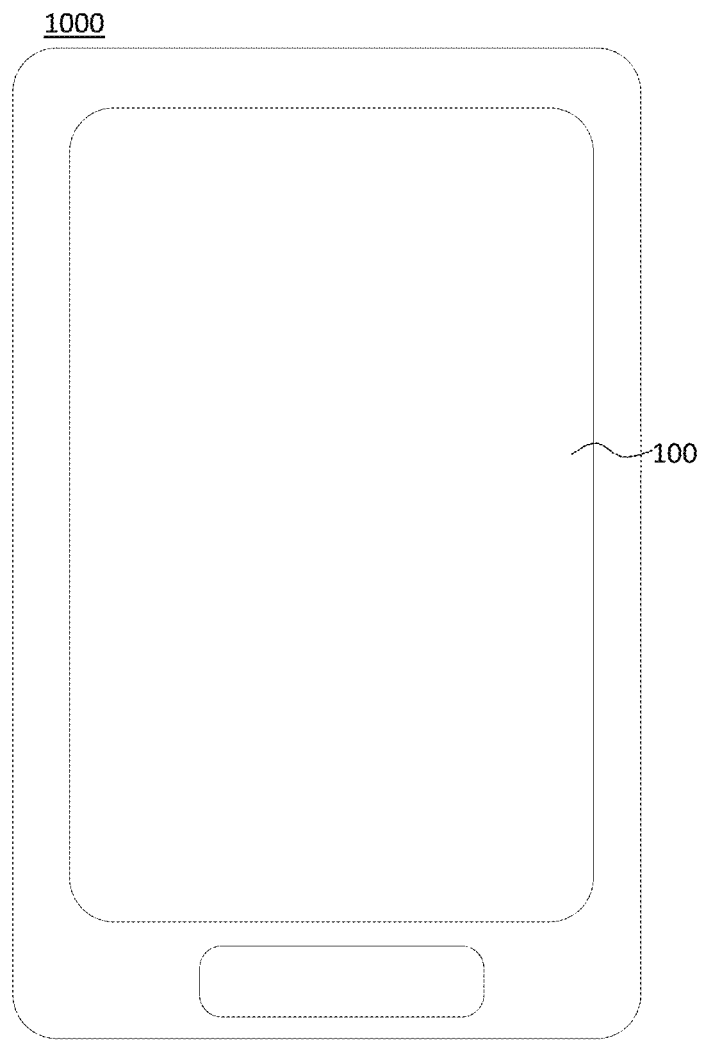
FIG. 24 is a schematic diagram of a display device provided by an embodiment of the present disclosure.

The present disclosure also provides a display device, including the display panel provided by the present disclosure. As shown in FIG. 24, FIG. 24 is a schematic diagram of a display device provided by an embodiment of the present disclosure. The display device 1000 includes the display panel 100 provided by any one of the above embodiments of the present disclosure. In the embodiment of FIG. 24, a mobile phone is used as an example to illustrate the display device 1000. It is understood that the display device provided by the embodiment of the present disclosure can be a computer, a television, a vehicle-mounted display device, and other display devices with display functions, which are not limited in the present disclosure. The display device provided by the embodiment of the present disclosure has the beneficial effects of the display panel provided by the embodiment of the present disclosure. For details, reference can be made to the specific description of the display panel in the above embodiments, and details are not described herein again in the present embodiment.

The above is a detailed description of the present disclosure in connection with the embodiments, but the present disclosure is not limited to these embodiments. Any deductions or replacements made by those skilled in the art without departing from the invention concept of the present disclosure shall fall within the protection scope of the present disclosure.

What is claimed is:

1. A protection film, comprising:
a main portion; and
at least one cover surrounded by the main portion,
wherein each of the at least one cover is at least partially connected to the main portion, at least part of an edge of each of the at least one cover is a first edge, and the first edge and the main portion are not fixed.

2. The protection film according to claim 1, wherein each of the at least one cover has at least one of a thickness smaller than a thickness of the main portion, or an elasticity greater than an elasticity of the main portion.

3. The protection film according to claim 2, wherein a hollow area is formed between the first edge and the main portion.

4. The protection film according to claim 3, wherein the main portion comprises a protrusion located at a side of the main portion close to the hollow area and extending towards the hollow area; and the protrusion and the hollow area overlap, the protrusion has a thickness smaller than the thickness of the main portion, and one of the at least one cover that is adjacent to the protrusion and the protrusion are located in different planes.

5. The protection film according to claim 4, wherein:

$$A = \sqrt{(l^2 + d^2)} + \sqrt{(a^2 + b^2)},\ B = \sqrt{(D-c)^2 + L^2},$$

and A<B,
where a denotes the thickness of the protrusion, b denotes a length of the protrusion in a first direction, d denotes the thickness of each of the at least one cover, l denotes a length of each of the at least one cover in the first direction, c denotes a distance between a bottom surface of the protrusion and a bottom surface of the main portion, and the first direction is a direction that is parallel to a plane of the protection film and perpendicular to a bending axis of the protection film.

6. The protection film according to claim 1, wherein each of the at least one cover has a first thickness at a portion of the cover close to the main portion and a second thickness at another portion of the cover close to the first edge, and the first thickness is greater than the second thickness.

7. The protection film according to claim 1, wherein when the protection film is flattened, the first edge is in contact with the main portion.

8. The protection film according to claim 1, wherein the main portion comprises a plurality of sub-layers, and each of the at least one cover and at least one of the plurality of sub-layers of the main portion are formed into one piece.

9. A display panel, comprising:
a protection film, wherein the protection film comprises a main portion and at least one cover surrounded by the main portion, wherein each of the at least one cover is at least partially connected to the main portion, at least part of an edge of each of the at least one cover is a first edge, and the first edge and the main portion are not fixed;
a substrate located on a side of the protection film; and
a light emitting functional layer located on a side of the substrate facing away from the protection film.

10. The display panel according to claim 9, wherein the substrate and the protection film are bonded through an adhesive layer.

11. The display panel according to claim 9, wherein a line connecting two ends of the first edge is not perpendicular to a bending axis of the display panel.

12. The display panel according to claim 9, wherein at least three non-collinear points are located on a path along which the first edge extends.

13. The display panel according to claim 9, wherein a hollow area is formed between the first edge and the main portion, the hollow area extends along an edge of one of the at least one cover and surrounds the cover in a non-closed manner, and a line connecting two ends of the hollow area is not perpendicular to a bending axis of the display panel.

14. The display panel according to claim 9, wherein a direction along which one of the at least one cover extends is not perpendicular to a bending axis of the display panel.

15. The display panel according to claim 9, wherein one of the at least one cover has a shape of a long strip with convex arcs at two ends thereof, or a rectangle with rounded corners.

16. The display panel according to claim 9, wherein the at least one cover comprises a plurality of covers, the plurality of covers is arranged along a second direction and staggered in a third direction, and the second direction intersects the third direction.

17. The display panel according to claim 9, wherein the at least one cover comprises a first cover and a second cover, the first cover is located on a side of the second cover facing away from a bending center of the display panel, and an area of the first cover is greater than an area of the second cover.

18. A manufacturing method of a protection film, wherein the protection film comprises a main portion and at least one cover surrounded by the main portion, each of the at least one cover is at least partially connected to the main portion, and each of the at least one cover comprises a first edge that is not fixed to the main portion; and
wherein the manufacturing method comprises:
providing a base material layer; and
laser engraving the base material layer to form the first edge.

19. The manufacturing method according to claim 18, further comprising:
before the laser engraving the base material layer to form the first edge, etching a first side of the base material layer to form a non-through opening,
wherein the laser engraving the base material layer to form the first edge comprises laser engraving a second side of the base material layer to form the first edge.

20. The manufacturing method according to claim 18, wherein the providing the substrate comprises providing a first sub-substrate and a second sub-substrate;
the manufacturing method further comprises: before the laser engraving the base material layer to form the first edge, etching the first sub-substrate to form a through opening; and
the laser engraving the base material layer to form the first edge comprises:
laser engraving the second sub-substrate to form the first edge, and bonding the first sub-substrate and the second sub-substrate, wherein the first edge corresponds to the through opening.

* * * * *